(12) United States Patent
Altomare

(10) Patent No.: US 8,326,719 B2
(45) Date of Patent: Dec. 4, 2012

(54) COMPOUND REDEMPTION DEVICE

(76) Inventor: Gerald Craig Altomare, Franklin Lakes, NJ (US)

( * ) Notice: Subject to any disclaimer, the term of this patent is extended or adjusted under 35 U.S.C. 154(b) by 0 days.

(21) Appl. No.: 12/848,155

(22) Filed: Jul. 31, 2010

(65) Prior Publication Data

US 2011/0060675 A1 Mar. 10, 2011

Related U.S. Application Data

(60) Provisional application No. 61/230,731, filed on Aug. 2, 2009.

(51) Int. Cl.
*G06Q 40/00* (2012.01)

(52) U.S. Cl. .......................................... 705/35; 705/37
(58) Field of Classification Search ............... 705/35–45
See application file for complete search history.

(56) References Cited

U.S. PATENT DOCUMENTS

2011/0202450 A1 * 8/2011 Cherney et al. ................. 705/37
* cited by examiner

*Primary Examiner* — Richard C Weisberger
(74) *Attorney, Agent, or Firm* — Joseph P. Kincart

(57) ABSTRACT

The present invention provides methods and apparatus one or more of: creating, issuing and redeeming Compound Redeemable Instruments. Apparatus can include a computerized system with executable software that is executable upon demand to process Redemption Instances as well as create and issue Compound Redeemable Instruments.

20 Claims, 22 Drawing Sheets

Instruments and Assets

| Instruments 1301 | $R_1$ | 1 share common |
|---|---|---|
| | $R_2$ | 1 share preferred |
| | $R_3$ | 1 warrant |
| Assets 1302 | $E_1$ | 1 bond |
| | $E_2$ | 1 oz gold |

| Sequential Event | 1305 |
|---|---|
| 0 | initial issuance |
| 1 | common share split |
| 2 | income attributed |
| 3 | expenses attributed |
| 4 | storage cost |
| 5 | warrant expired |
| 6 | bond matured |
| 7 | vehicle terminated |

| Sequential Event | 0 | 1 | 2 | 3 | 4 | 5 | 6 | 7 |
|---|---|---|---|---|---|---|---|---|
| $r_1$ | 1 | 2 | 2 | 2 | 2 | 2 | 2 | 0 |
| $r_2$ | 2 | 2 | 2 | 2 | 2 | 2 | 2 | 0 |
| $r_1$ | 3 | 3 | 3 | 3 | 0 | 0 | 0 | 0 |
| $e_1$ | 1 | 1 | 1 | 1 | 1 | 1 | 0 | 0 |
| $e_2$ | 2 | 2 | 2 | 1.99 | 1.99 | 1.99 | 1.99 | 0 |
| v | 20 | 19.9 | 19.9 | 19.9 | 19.9 | 19.9 | 19.9 | 0 |
| u | 1 | 1 | 0.99 | 0.99 | 0.99 | 0.99 | 0.99 | 0 |
| Instrument Set 1303 | $20R_1$ | $40R_1$ | $39.8R_1$ | $39.8R_1$ | $39.8R_1$ | $39.8R_1$ | $39.8R_1$ | $39.8R_1$ |
| | $40R_1$ | $40R_2$ | $39.8R_2$ | $39.8R_2$ | $39.8R_2$ | $39.8R_2$ | $39.8R_2$ | $39.8R_2$ |
| | $60R_1$ | $60R_2$ | $59.7R_3$ | $59.7R_3$ | $59.7R_3$ | 0 | 0 | 0 |
| Asset Set 1304 | $E_1$ | $E_1$ | $0.99E_1$ | $0.99E_1$ | $0.99E_1$ | $0.99E_1$ | $0.99E_1$ | 0 |
| | $2E_2$ | $2E_2$ | $1.98E_2$ | $1.97E_2$ | $1.97E_2$ | | | |

FIG. 13

COMPOUND REDEMPTION DEVICE

CROSS REFERENCE TO RELATED APPLICATION

This application claims priority to Provisional Patent Application U.S. Ser. No. 61/230,731, filed Aug. 2, 2009, entitled Compound Redeemable Instrument Processor. The contents of each are relied upon and incorporated by reference.

FIELD OF THE INVENTION

The present invention generally relates to systems and methods for financial investment. Particular embodiments relate to automated apparatus and integrated software for creating, acquiring and redeeming novel Compound Redeemable Instruments.

BACKGROUND OF THE INVENTION

It is a generally known practice for investors to seek to make investments with high returns within a risk profile. That investment considerations may also include other investment characteristics, such as: liquidity, transparency, price, growth potential, income potential, regulatory considerations, tax considerations, accounting considerations, and so on, is also well known. While investor needs differ, many share the goal of maximizing a return for a given level of risk.

Liquidity of an investment instrument is an important factor to many investors, particularly as liquidity relates to the evaluation of risk. Investments that can be more readily converted to cash, or other desirable instruments, quickly and without discount; are perceived to be less risky than similar less-liquid instruments. As a result, investors seeking strategies to manage risk and return usually prefer instruments that can be traded or redeemed compared to those that cannot.

Transparency of an investment instrument is another important factor to many investors as it relates to the evaluation of risk. Investments can be understood more easily based upon an issuer being open about a business associated with a particular investment. An investment with open details related to the associated business may be perceived to be less risky than similar less transparent instruments. As a result, investors seeking strategies to manage risk and return usually prefer instruments that are more easily understood compared to those that are not. Issuers may therefore seek to attract investor capital by providing financial instruments that deliver an appealing package of risk and return.

Providing liquidity and transparency through exchange listing and public reporting enhances an issuance but may be impractical for reasons including the burdens and costs of public registration, offering and exchange listing. As a result, many securities are privately placed and thinly traded or not traded at all.

While many large companies have the financial strength to register publicly and list their securities, many other companies including smaller issuers and special purpose companies and investment vehicles do not. In addition, some larger companies, operating companies and investment entities; that may or may not publicly register and list their securities; may still have limited liquidity and be less attractive to investors either because their investment instruments are not interesting to investors or well understood in the marketplace.

The importance of liquidity and transparency was particularly apparent during the financial crises of 2008 when the securities of otherwise attractive private structured financings including mortgage-backed securities and asset-backed securities, among others, traded at dramatic discounts to their net asset value because a lack of liquidity and poor transparency magnified the perceived risk of these instruments during a time of market stress. Many investors in these securities were required to sell and realized significant losses attributable in part to the inability to access trapped value.

It is worth noting that even liquid and transparent investment instruments may trade at significant discounts to the net asset value of the underlying assets. An example of where this may be important is the closed-end fund marketplace where fully transparent closed-end funds that are listed on major exchanges often trade at a discount to net asset value.

Another prior known way to address liquidity and transparency is with securities that can be redeemed for value on a periodic or continual basis. Publicly offered open-end mutual funds and exchange-traded funds provide liquidity and transparency by enabling the redemption of a single class of investment instruments in exchange for a pro-rata portion of an issuer's assets or the cash value of such assets. This direct access to the value of underlying assets greatly reduces the risk of holding assets in a vehicle. Generally, the process of redemption causes value to be withdrawn from issuers; therefore holders of non-redeemable instruments become disadvantaged compared to holders of the redeemable instruments. Making one or more other instruments redeemable as well is not practical using traditional redemption techniques. This is because the integrity of payout preferences and seniority for each different class may only be maintained on a relative basis with overly complex redemption formulae.

A bipartite stock certificate (as described in U.S. Pat. No. 4,093,276) created a redeemable investment unit separable into components that may be recombined into a single unit of redeemable equity. The components are essentially derivative interests in the issuer's equity rather than separate interests in its capital structure. This proved to be a major drawback contributing to entity-level taxation under the "Sears Regs" (reg. section 301.7701-4) that made the issuance of these certificates impractical.

Other securities similar to the bipartite stock certificate such as SuperShares™ divide investment units into more complicated interests in the equity of the issuer. One aspect each of these approaches has in common is that it creates derivative interests in the issuer's equity rather than direct interests in its capital structure. This may have important ramifications to the investor as to tax treatment, regulatory treatment and seniority, among others.

Financial engineers have created other instruments in their attempts to create multiple classes of redeemable interests. One such approach, described as a Proxy Asset Data Processor in U.S. Pat. Nos. 5,987,435; 6,513,020; and Patent Application number 2008/0027847, employs an indirect and cumbersome cash management system allocating referenced returns among trusts issuing equity.

Other prior art approaches and products exist as well; however, there remains a need in the marketplace for improved liquidity and transparency through the ability to redeem multiple classes of investment instruments. The preceding description is not to be construed as an admission that any of the description is prior art relative to the present invention.

SUMMARY OF THE INVENTION

According to the present invention, a Compound Redeemable Instrument System includes apparatus for redeeming two or more Compound Redeemable Instruments of different classes in exchange for one or more Exchangeable Assets of a specified class or classes. The apparatus generally includes a processor in logical communication with a storage device and executable software stored on the storage device. The processor and software is functional to manifest the concepts and instruments referenced herein. According to the present invention, creation of two or more Compound Redeemable Instruments of different classes can be accomplished by deposit of Exchangeable Assets of a specified class or classes. A Compound Redemption Processor may also be used to create Compound Redeemable Instruments through direct issuance for cash or otherwise, or may be used to convert instruments which are not Compound Redeemable Instruments into Compound Redeemable Instruments. Investors may acquire Compound Redeemable Instruments either from an issuer or in a secondary market transaction. In some embodiments, Compound Redeemable Instruments may be publicly listed. Compound Redeemable Instruments have value based on their individual terms as instruments issued directly by the issuer and by virtue of their ability to be redeemed using the Compound Redemption Processor for Exchangeable Assets in a process referred to herein as Compound Redemption.

Apparatus included in a Compound Redemption Processor may incorporate computer hardware and stored protocol of processing logic to properly specify the minimum number of Compound Redeemable Instruments redeeming in exchange for Exchangeable Assets in a single instance of Compound Redemption. In some embodiments, a Compound Redemption Processor is capable of managing individual and multiple instances of Compound Redemption simultaneously or in sequence. The Compound Redemption Processor organizes and tracks instruments in a database as controlled by the processing logic of the computer system, to insure proper administration of the Compound Redeemable Instruments during their term. The proper implementation and management of the Compound Redemption Processor will affect the pricing efficiency and marketability of Compound Redeemable Instruments. One part of some embodiments of a Compound Redemption Processor is a data processing system that conveys information about Exchangeable Assets, including valuation information, to the marketplace making such information available in essentially real time, or at least without any significant artificial delays built in.

The data processing system and method for executing trades provides that redeeming, creating, trading, managing and reporting of Compound Redeemable Instruments is seamless, automatic and efficient. A linked database in accordance with a stored protocol permits commercial transactions of Compound Redeemable Instruments enabling the distribution and trading of Compound Redeemable Instruments. The Compound Redeemable Instruments are exchanged in the market either via conventional brokerage services or directly through a trading system defined here, allowing a broad spectrum of investor access to this instrument with improved investment and risk management capabilities compared to other financial instruments.

In one aspect of some embodiments of the present invention, a Compound Redemption Processor provides for the redemption of two or more classes of Compound Redeemable Instruments, or their cash equivalent, in exchange for the withdrawal of Exchangeable Assets, or their cash equivalent, on an ongoing basis with enhanced speed, efficiency and control.

In another aspect of the present invention the Compound Redemption Processor provides for the creation of Compound Redeemable Instruments on an ongoing basis with enhanced speed, efficiency and control, including means for establishing or identifying the issuer, means for determining the terms of Compound Redeemable Instruments, and means for determining Exchangeable Assets.

In another aspect of the present invention the Compound Redemption Processor provides for the issuance of Compound Redeemable Instruments in exchange for the deposit of Exchangeable Assets or equivalent value on an ongoing basis with enhanced speed, efficiency, and control.

In another aspect of the present invention the Compound Redemption Processor provides for the conversion of an issuer's existing instruments into Compound Redeemable Instruments on an ongoing basis with enhanced speed, efficiency, and control.

In another aspect of the present invention, the Compound Redemption Processor provides for the distribution, management and support of Compound Redeemable Instruments and Exchangeable Assets on an ongoing basis. Distribution, management and support can be on a periodic basis or on demand. Automated apparatus can provide enhanced speed, efficiency and control, including without limitation: apparatus for receiving, managing and distributing Exchangeable Assets; other collateral, apparatus for receiving input from the capital markets; apparatus for determining and maintaining rates of exchange between Compound Redeemable Instruments and Exchangeable Assets; and apparatus for engaging and maintaining the Depositor. In addition, automated apparatus may include means for managing terms associated with a Compound Redeemable Instrument, including without limitation: making payments of Compound Redeemable Instruments; extinguishing Compound Redeemable Instruments; providing reporting information for issuers and to customers for administrative and record keeping purposes including tax reporting; and liquidating an issuer of Compound Redeemable Instruments.

In accordance with the varying aspects of the present invention, the Compound Redeemable Instrument may be available as a separate trading security. In an associated aspect, the Compound Redemption Processor provides trading support for Compound Redeemable Instruments. Trading support may include communicating to investors and potential investors' relevant information to evaluate transactions such as information as to the terms of Compound Redeemable Instruments and Exchangeable Assets and as to the composition of Instrument Sets, Instrument Units, Asset Sets and Asset Units, among others.

The present invention accordingly comprises the features of construction, combination of elements and arrangement of parts that will be exemplified in the following detailed disclosure, and the scope of the invention will be indicated in the claims. Other features and advantages of the present invention will be apparent from the description, the drawings and the claims.

The foregoing specific aspects and advantages of the present invention are illustrative of those which can be achieved by the present invention and are not intended to be exhaustive or limiting of the possible advantages that can be realized. Thus, the aspects and advantages of this invention will be apparent from the description herein or can be learned from practicing the invention both as embodied herein or as modified in view of any variations that may be apparent to those skilled in the art. Accordingly, the present invention resides in the novel parts, constructions, arrangements, combinations and improvements herein shown and described. The present invention has several important technical advantages. In various embodiments it may have none, some, or all of these technical advantages.

BRIEF DESCRIPTION OF THE DRAWINGS

Embodiments and other aspects of the invention are best understood with reference to the detailed disclosure and the following figures, which are meant to illustrate and not limit the invention, and in which:

FIG. 13 illustrates an exemplary spreadsheet including computation of the ratio and numbers of CRIs and EAs in Compound Redemption according to some embodiments of the present invention.

Figure 1A:
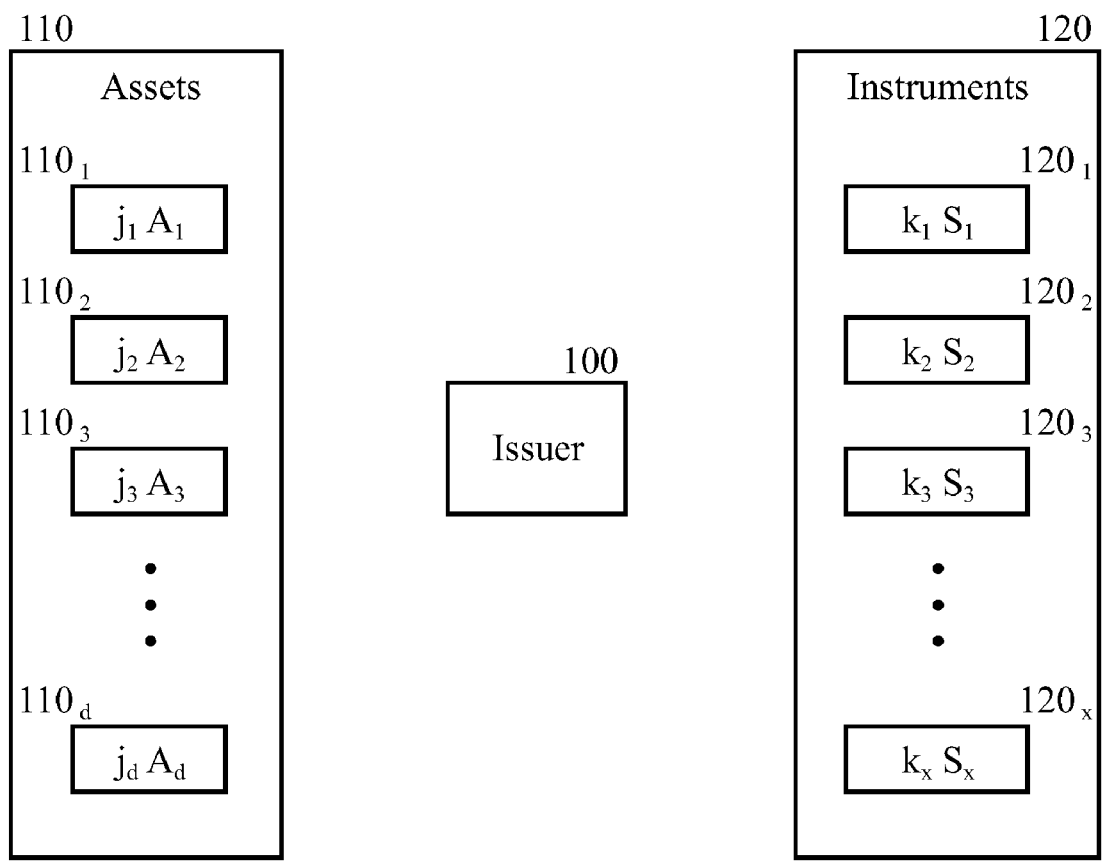
FIG. 1A illustrates a diagram depicting prior art with an issuer issuing fungible instruments grouped in classes and owning or controlling a right to acquire or divest fungible assets grouped in classes.

It should be understood by one skilled in the art that the embodiments depicted in the drawings are illustrative and variations of those shown as well as other embodiments described herein may be envisioned and practiced within the scope of the disclosure.

DETAILED DESCRIPTION OF THE EMBODIMENTS

Accordingly, the present invention provides novel apparatus and methods related to the issuance and redemption of Compound Redeemable Instruments from disparate specified financial classes, such as, for example equity classes, debt classes, classes of contracts, and other classes of financial instruments. The CRIs are jointly redeemable in exchange for specified assets. In some embodiments, issuance and redemption of the Compound Redeemable Instruments takes place on an ongoing basis.

Generally, a Compound Redeemable Instrument is a financial instrument that is jointly redeemable with other issuer instruments belonging to different classes. Instruments of the Issuer may be otherwise difficult to efficiently exchange for value. According to the present invention, specified Compound Redeemable Instruments are redeemable for specified assets according to an instance of Compound Redemption. The relative value of the instruments of different classes in an instance of Compound Redemption is determined by market demand and the aggregate value of such instruments is efficiently determined by the value of the specified assets for which they can be exchanged. Multiple types of instruments may be issued as, or transformed into, a Compound Redeemable Instrument by an issuer in exchange for specified assets.

The use of Compound Redeemable Instruments allows for the creation of one or both of new and improved Financial Instruments which are redeemable in instances of Compound Redemption for Exchangeable Assets. The instruments may include derivatives, securitizations and corporate financings. The new Financial Instruments will be capable of increased transparency over existing Financial Instruments and increased liquidity.

As a result of the methods and apparatus disclosed, investors, dealers and issuers will benefit from improved liquidity and transparency as compared to non-redeemables; arbitrage pricing efficiency; new methods and apparatus for managing risk and return; simplicity of Financial Instrument make up; and efficiency in trading; new, improved special purpose vehicles; a revitalization of collateralized businesses; derivatives on illiquid underlyings; securitized prime brokerage; synthetic stock lending; increased trading opportunities; and corporate financing opportunities; new corporate redeemables; issuance of more redeemables; revitalization of existing instruments; securitization of inventory and embedded margins, amongst other benefits.

Compound Redeemable Instruments can be traded via the apparatus and methods described herein using U.S., non U.S. and global, public and private markets, exchanges, services and platforms, among others, including examples such as the New York Stock Exchange, NASDAQ, the London Stock Exchange, the Cayman Islands Stock Exchange, Bloomberg® and Reuters® pages, the NASDAQ PORTAL Alliance system, and private dealer markets, among others.

Definitions

As used herein, the following terms shall be associated with the specified definitions:

"Asset Unit" as used herein, refers to a relative number of Exchangeable Assets exchangeable in an instance of Compound Redemption.

"Asset Set" used herein, refers to an absolute number of Exchangeable Assets exchangeable in an instance of Compound Redemption.

"Compound Redeemable Instrument" as used herein and sometimes referred to as a "CRI" or multiple "CRIs" includes an issuer Financial Instrument jointly redeemable with one or more other Financial Instruments in exchange for one or more predefined Exchangeable Assets of one or more classes, wherein the issuer Financial Instrument and the one or more other Financial Instruments are of disparate classes. In the case of disparate issuers, disparate issuers may be determinative of disparate classes.

"Compound Redemption" as used herein and sometimes referred to as a "CR" or multiple "CRs" refers to the predefined joint redemption of independent CRIs of two or more disparate classes in exchange for one or more Exchangeable Assets.

"Compound Redemption Processor" an automated computer processor in logical communication with a digital storage. The digital storage stores executable code which is operative with the processor to process some or all aspects of a Compound Redemption.

"Exchange Traded Note" as used herein, refers to an exchange-traded note (ETN) such as an exchange traded, equity-linked, senior, unsecured, unsubordinated obligation issued by a corporation. ETNs have a maturity date and are backed by the credit of the issuer.

"Exchangeable Asset" as used herein and sometimes referred to as an "EA" or multiple "EAs" can include an asset specified as exchangeable for CRIs in an instance of Compound Redemption. By way of non-limiting example, an Exchangeable Asset can include one or more: stock, bond, inventory, service, contract, commodity, portfolio, right, real estate, agreement, mortgage, note, receivable, cash, currency, coupon, precious metal, energy unit or other transferable Financial Instrument or asset, including securities of the issuer not Compound Redeemable or if Compound Redeemable not in the Redemption Instance in which they are Exchangeable Assets.

"Financial Instrument" shall herein include pecuniary value based upon any stock or certificate of interest or participation in a company, or any indebtedness or obligation or any other instrument falling either within or without of the definition provided by the Securities Exchange Acts of 1933 or 1934 for a financial security including instruments that are not financial securities; including therefore, but not limited to, any: note, equity, common stock, preferred stock, treasury stock, futures contract, senior bond, junior bond, convertible bond, ownership interest, debenture, certificate of interest, option contract, hybrid bond, derivative, trust unit, swap, repo, forward, or participation in any profit-sharing agreement or in any oil, gas, or other mineral royalty or lease, any collateral-trust certificate, pre-organization certificate or subscription, transferable share, investment contract, voting-trust certificate, certificate of deposit for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase.

"Processor Manager" as referred to herein refers to an entity that controls an exchange of Exchangeable Assets for a Compound Redeemable Instruments.

"Instrument Unit" used herein, refers to a relative number of Compound Redeemable Instruments redeeming in an instance of Compound Redemption.

"Instrument Set" used herein, refers to an absolute number of Compound Redeemable Instruments redeeming in an instance of Compound Redemption.

"Maturity Payment" used herein, refers to a payment received following the holding of a CRI to the end of a term of a related instrument.

"Redemption Instance" as used herein and sometimes referred to as "RI" is an instance of Compound Redemption which includes a predefined exchange of CRIs jointly redeeming in exchange for Exchangeable Assets.

"Redemption Notice" as used herein, refers to a notification by a holder or other controller of a CRI which includes the holder's intent to redeem an indicative number and class of Compound Redeemable Instruments by effecting one or more instances of redemption.

In some embodiments of the present invention, a newly formed special purpose vehicle (SPV) issues derivative instruments and equity instruments jointly redeemable for specified commodities. The derivative may have, for example, a payout linked to equity, housing or even the commodity. Should the market value of the derivative and the equity vary from the commodity, arbitrage opportunities would exist to bring a relative price of the equity and the derivative into balance. In another example, the outstanding shares and bonds of a company can be transformed into Compound Redeemable Instruments jointly redeemable for the finished goods inventory of the issuer enabling the marketplace to value the issuers' securities on the basis of its marked-up products.

The present invention provides a Compound Redemption Processor apparatus capable of creating, distributing, managing, and maintaining a plurality of Compound Redeemable Instruments of a plurality of classes, instruments of one class redeemable together with instruments of one or more other classes in accordance with pre-determined criteria in exchange for specified Exchangeable Assets of one or more classes on an ongoing basis, and also executing trade, transformation, issuance and redemption of such Compound Redeemable Instruments. Compound Redeemable Instruments provide the ability to own and trade a single financial instrument having a unique and attractive matrix of properties allowing enhanced investment opportunities.

A Compound Redemption Processor is employed as part of a Compound Redeemable Instrument System and includes processors in logical communication with executable code which upon execution causes the processor to be functional to one or more of: create, distribute, manage, maintain, redeem, and extinguish the Compound Redeemable Instruments. A data processor according to the present invention makes possible a fundamentally new kind of instrument by defining and managing the absolute and relative numbers and classes of instruments and assets comprising instances of Compound Redemption, and also facilitating trade, creation and redemption of such Compound Redeemable Instruments thereby facilitating pricing arbitrage and efficient market pricing.

In some respects, Compound Redeemable Instruments may resemble other instruments which investors may be familiar with; however, CRIs differ in their ability to be redeemed in instances of Compound Redemption. Compound Redeemable Instruments therefore have the advantage of being both familiar to investors and superior in their liquidity and transparency. The Compound Redeemable Instruments are familiar in terms of the kinds of structures that investors become involved with from a tax and regulatory perspective and offer the same feeling of financial soundness plus the benefits of Compound Redemption. The Compound Redemption Processor is designed to reinforce and confirm these impressions among investors by facilitating the basic functions necessary for the Compound Redeemable Instrument's comparability and advantages compared with other assets.

Apparatus and executable code utilized to create or process CRIs may take into account multiple factual considerations in order to optimize the success of a CRI offering and redemption. Considerations may include, for example, one or more of: a ratio of CRIs redeeming to the number issued; a ratio of assets exchanging as Exchangeable Assets; a ratio of CRIs to Exchangeable Assets; administration of changes to one or both of the CRIs and the Exchangeable Assets; cash and/or physical settlements; and expense and income attributions.

According to the present invention, the above functions and other aspects are realized in a CRI System including apparatus and executable software. A CRI Data Processor is linked to a database for managing the process of CR. Investors become holders of CRIs having exchange value by virtue of their ability to be redeemed for EAs. The parameters governing CR instances are periodically adjusted in accord with changes in the relative and absolute numbers of CRIs redeeming and changes in the relative and absolute numbers of EAs exchanging. These changes may reflect issuer-related income, expenses or corporate actions or asset-related income, expenses or modifications whether or not the assets are actually owned by the issuer.

In various embodiments, a CRI database includes digital data descriptive of at least one account, instrument and asset information, and stores parameters that govern an instance on a periodic basis as controlled by processing logic inherent in the executable software. At set intervals the system addresses the proportion of instruments redeeming by changing or not changing the coefficients of the Instrument Unit and the absolute number of instruments redeeming by changing or not changing the multiplier for the Instrument Set. Also at set intervals, the system addresses the proportion of assets exchanging by changing or not changing the coefficients of the Asset Unit and the absolute number as assets redeeming by changing or not changing the multiplier for the Asset Set. The system provides for the creation of Compound Redeemable Instruments by enabling newly created and issued instruments and outstanding instruments for Compound Redemption using the Compound Redemption Processor.

Overview

Referring now to FIG. 1A, a diagram illustrates prior art scenario involving an issuer issuing instruments comprising multiple classes. The instruments within each class of instrument are fungible, and assets owned comprise classes, the assets within each class of asset being fungible. This diagram is included herein because it is useful for illustrative purposes in order to establish a framework for explaining certain embodiments of the present invention.

With reference to FIG. 1A, issuer 100 owning assets 110 comprising classes $110_{1-d}$ each comprising a number $j_d$ of fungible asset Ad issues Instruments 120 comprising classes $120_{1-x}$ each comprising a number $k_x$ of a fungible Instrument $S_x$. Issuer 100 may be, for example, newly-formed or pre-existing, an operating company or special purpose vehicle, managed actively or not managed actively, or structured as a corporation, limited liability company, or other legal entity including an exchange, such as, for example, a futures or options exchange, which issues financial instruments.

Assets 110 may be, for example, any items of property, including real property, personal property, tangible property or intangible property or any interests therein which may be readily transferable or not. In one example, assets 110 comprise shares of stock listed on public exchanges of various companies comprising classes $110_{1-d}$ each comprising number $j_d$ of single company share $A_d$. In another example, assets 110 comprise condominium units in different buildings comprising classes $110_{1-d}$ each comprising number $j_d$ of single building condominium unit $A_d$. In another example, assets 110 include one or more classes $110_{1-d}$ each comprising interests in notional principal contracts known as swap agreements. In another example, assets 110 include one or more classes $110_{1-d}$ comprising different types of cash instruments.

Instruments 120 may be, for example, ownership units, debt obligations, or contract agreements. In one example, Instruments 120 comprise bonds of different maturities each class $121_x$ comprising a number $k_x$ of single maturity bond $S_x$. In another example, Instruments 120 comprise common shares and types of contracts comprising classes each class $120_x$ comprising $k_x$ of common share or single contract $S_x$.

In one example, Assets 110 comprise 1000 U.S. Treasury Bonds of a single series and Instruments 120 comprise 10,000 units of ownership of trust issuer 100 and 20,000 contracts linked to shares of IBM. In this example, Assets 110 comprise class $110_1$ where $j_1$ equals 1000 and $A_1$ represents a single U.S. Treasury Bond and Instruments 120 comprise classes $120_1$ and $120_2$ where $k_1$ equals 10,000 and $S_1$ represents a single unit and $k_2$ equals 20,000 and $S_2$ represents a single contract.

In another example, Assets 110 comprise screws of several different classes and Instruments 120 comprise shares of stock and bonds of screw manufacturer 100.

Figure 1B:
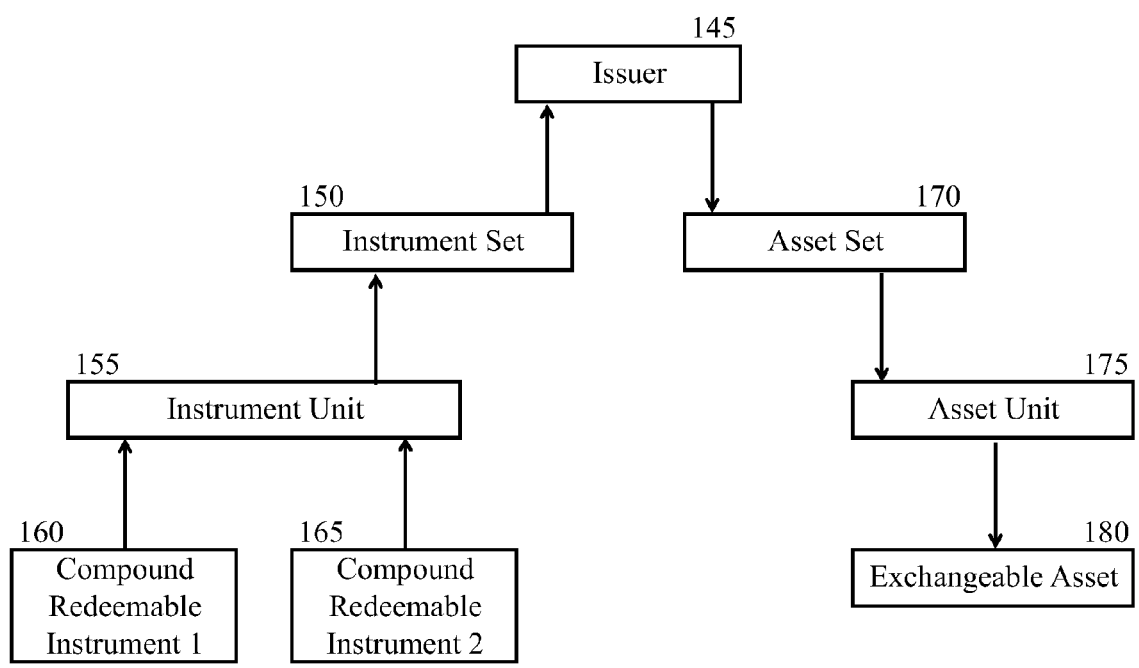
FIG. 1B illustrates a block diagram depicting some exemplary embodiments of the present invention including a single instance of Compound Redemption.

FIG. 1B illustrates a block diagram depicting some exemplary embodiments of the present invention including a single instance of Compound Redemption. In such instances, one asset $A_1$ 110 from a single class $110_1$ is distributed by issuer 100 in exchange for the redemption of two financial instruments of separate classes $S_1$ of class $120_1$ and $S_2$ of class $120_2$.

Issuer 145 in FIG. 1B may generally be considered equivalent to an issuer 100 in FIG. 1A. In FIG. 1B Compound Redeemable Instrument 1 160 and Compound Redeemable Instrument 2 165 are each from a separate class $120_x$ FIG. 1. These instruments redeem together through the system of Compound Redemption in exchange for the distribution of Exchangeable Asset 180 an asset of a single class $110_d$.

In this exemplary embodiment, the system operates by grouping Compound Redeemable Instrument 1 and Compound Redeemable Instrument 2 as one Instrument Unit 155 comprising one Instrument Set 150 redeeming in exchange for one Asset Set 170 comprising one Asset Unit 175 comprising one Exchangeable Asset 180. This embodiment illustrates in simplified form, a system of Compound Redemption wherein independent instruments from separate classes redeem jointly in exchange for a single class of asset. In this and other instances of CR the issuer may retain, extinguish or re-issue redeemed CRIs.

Figure 2:
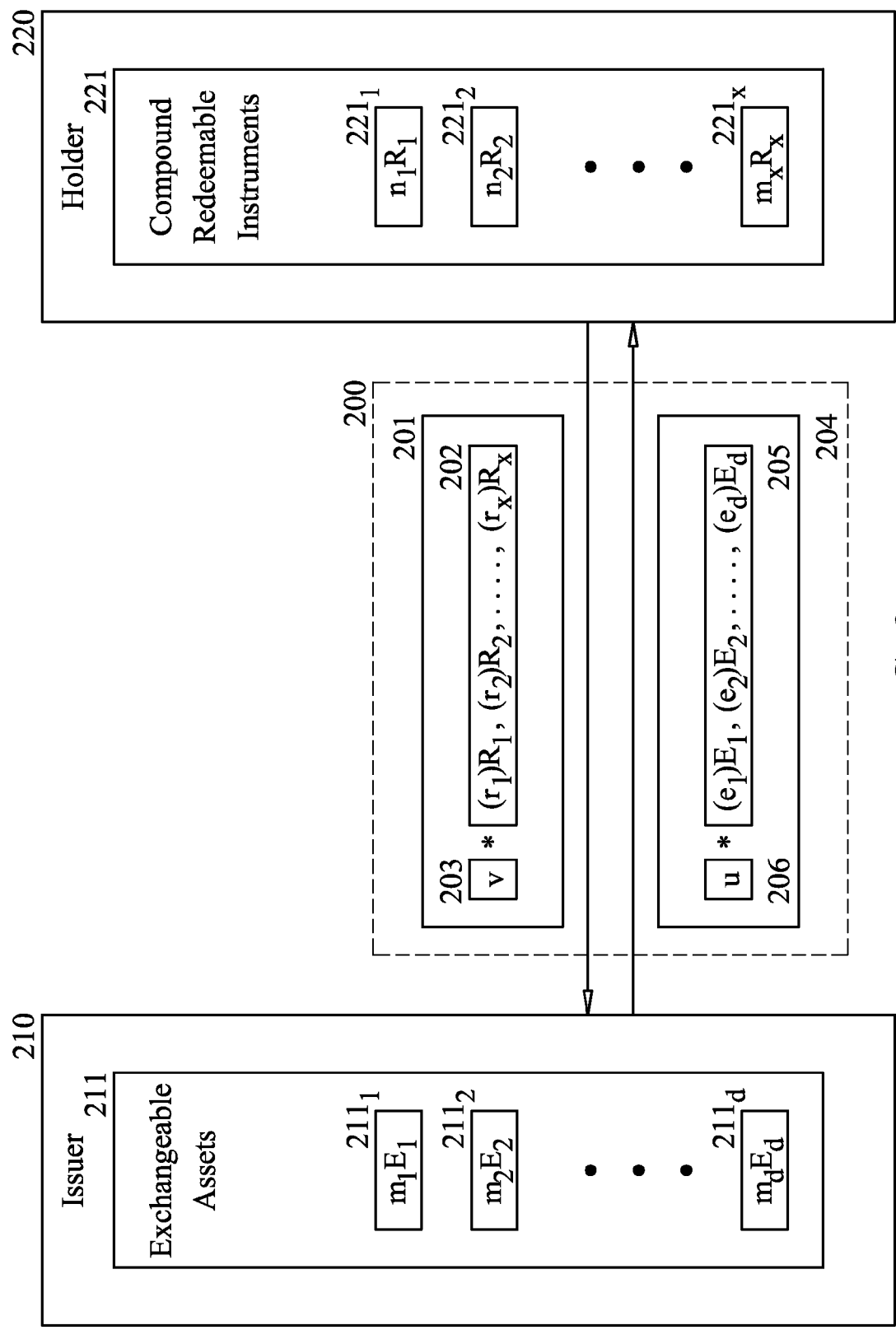
FIG. 2 illustrates one instance of the Compound Redemption of instruments according to an embodiment of the invention.

Other embodiments including those of greater variety and complexities wherein instruments from at least two classes of instruments redeem in exchange for assets from at least one class of asset are illustrated in FIG. 2.

Referring now to FIG. 2, a block diagram illustrates exemplary configurations and systems for various embodiments of the invention. Issuer 210 may generally considered to be equivalent to an Issuer 100 in FIG. 1A. Issuer 210 may be the owner of Exchangeable Assets 211 or may acquire these assets in order to fulfill its obligations under one or more instances of Compound Redemption described herein. Holder 220 is the owner of Compound Redeemable Instruments 221 or may acquire these assets in order to fulfill its obligations under one or more instances of Compound Redemption.

Redemption Instance 200 occurs when Compound Redeemable Instruments Rx 221 comprising more than one of Instrument Classes $221_{1-x}$ redeem in exchange for Exchangeable Assets $E_d$ 211 comprising one or more of Asset Classes $211_{1-d}$. As such, Instruments 120 in FIG. 1A become Compound Redeemable Instruments if they can be redeemed in this fashion and Assets 110 in FIG. 1A become Exchangeable Assets if they are exchangeable in this fashion. As a result, Compound Redeemable Instruments 221 are a subset of Instruments 120 in FIG. 1A that issue as or subsequently become Compound Redeemable Instruments such that $n_x$ $221_{1-x}$ is less than or equal to $k_x$ $120_{1-x}$ in FIG. 1A and Exchangeable Assets 221 comprise Assets 110 in FIG. 1A that are acquired as or owned and later become Exchangeable Assets such that $m_d$ $211_{1-d}$ is less than or equal to $j_d$ $110_{1-d}$.

In some embodiments of the invention, Issuer 210 issues only Compound Redeemable Instruments 221.

In other embodiments of the invention, Issuer 210 issues interests (such as 120 in FIG. 1A) which are not Compound Redeemable Instruments 221. Such interests can include any sort of instrument other than Compound Redeemable Instruments including for example equity, debt, contracts, swap agreements, warrants and derivatives which are not redeemable, or which are individually redeemable such as the shares of an open-end mutual fund or certain unit investment trusts.

In other embodiments of the invention, Compound Redeemable Instruments 221 may include instruments of more than one issuer 210. For example, in some alternative embodiments, Trust A may issue 1000 equity units to investors and a single contract to Trust B using the proceeds to acquire 1000 bonds. Trust B issues 1000 equity units to investors representing interests in the contract acquired from trust A. Trust A and Trust B compound redeem one Trust A equity unit and one Trust B equity unit (note that these equity units are of disparate classes being equity units of different issuers) for one bond received by Trust A and a reduction in the notional amount of the contract between Trust A and Trust B (in this example by $\frac{1}{1000}^{th}$). Similarly, Trust A and Trust B may create equity units and increase the notional of the contract between Trust A and Trust B.

In furtherance of the discussion related to this exemplary embodiment, Trust A does not issue a formal contract to Trust B which issues contracts to investors. Trust A and Trust B compound redeem one Trust A equity unit and one Trust B contract for one bond withdrawn from Trust A. Similarly, Trust A and Trust B create one Trust A equity unit and one Trust B contract for one bond deposited into Trust A.

In some specific examples, Exchange Traded Notes or ETNs may be Compound Redeemable Instruments 221. ETNs generally are obligations of an issuer that are listed and traded on a securities exchange such as the NYSE and provide investors access to the return of a market index. The return associated with an ETN at maturity or upon redemption is derived from the performance of a benchmark, typically a market index, which may be adjusted for fees and other costs. An investor fee is usually associated with ETNs. The investor fee may be calculated in different ways, but will generally be calculated on a cumulative basis each day based on a yearly fee and the performance of the underlying index.

ETNs closely track index performance because their payout and redemption value is specified in terms of the benchmark and varies primarily because of fees and costs, but may also vary because of a change in the credit worthiness of the issuer. This is different as compared to Exchange Traded Funds (ETFs) which own assets managed by the fund manager to track the benchmark. ETFs don't usually have credit risk, but may experience tracking error associated with the management of assets as well as fees and costs.

Two or more CRIs which are ETNs enable investors to closely track a benchmark or to efficiently achieve more efficient variations of risk and return associated with a benchmark compared to a conventional ETN. For example, one ETN which is a CRI can provide the performance of an index, adjusted for fees and other costs, up to and including a cap level (Target®) and another ETN which is a CRI can provide the performance of an index, adjusted for fees and other costs, above the cap level (SuperTarget®). The Target® and SuperTarget® use Compound Redemption to access the Exchangeable Asset which is a cash amount providing the performance of the benchmark similar to a conventional ETN. However, by investing in relatively more Targets® or SuperTargets® other variations of risk and return can be achieved. Targets® and SuperTargets® resemble conventional structured products which are not redeemable; however, because they are CRIs these structured products are jointly redeemable for cash and more liquid than conventional structured products.

For illustrative purposes, and by way of non-limiting example, an issuer in the above example may be an exchange, such as, for example, a futures exchange issuing contracts with economics similar to Targets® and SuperTargets® which are compound redeemable for an index value.

In another embodiment of the invention, Issuer 210 issues Instruments 120 in FIG. 1A which are not redeemable when issued, but subsequently become Compound Redeemable Instruments 221. This might be the case where an issuer has a class of outstanding equity and a class of outstanding debt that the issuer causes to become Compound Redeemable Instruments 221 subsequent to the issuance redeeming in exchange for one or more classes of asset that it owns or will acquire.

In one embodiment of the invention, a Redemption Instance 200 specifies Instrument Set 201 comprising Multiplier v 203 number of Instrument Units 202 comprising coefficients $r_{1-x}$ numbers of Compound Redeemable Instruments $R_x$ redeeming in exchange for Asset Set 204 comprising Multiplier u 206 of Asset Units 205 comprising coefficients $e_{1-d}$ numbers of Exchangeable Assets $E_d$.

In other embodiments, Redemption Instance 200 comprises Instrument Set 201 comprising the smallest non-negative integer number of Compound Redeemable Instruments redeeming in exchange for Asset Set 204 comprising the smallest non-negative integer number of Exchangeable Assets where Instrument Unit 202 comprises the smallest non-negative integer numbers $r_{1-x}$ at least $r_1$ and $r_2$ being positive of $R_{1-x}$, Multiplier v 203 represents the smallest non-negative integer number of Instrument Units 202, Asset Unit 205 comprises the smallest non-negative integer numbers $e_{1-d}$ at least $e_1$ being positive of $E_{1-d}$, and Multiplier u 206 represents the smallest non-negative integer number of Asset Units 205. For example, the number and class of Compound Redeemable Instruments redeeming in Instrument Set 201 comprises 100 shares of common equity and 20 derivative contracts where Instrument Unit 202 comprises 5 shares and 1 contract and Multiplier v equals 20, and the number and class of Exchangeable Assets exchanging in Asset Set 204 comprises 3 corporate bonds where Asset Unit 205 comprises 1 bond and Multiplier u 206 equals 3. The ratio of u/v in various embodiments of the invention is referred to herein as a Redemption Ratio. In this example, the Redemption Ratio is 3/20.

In still other embodiments of the invention, a Redemption Instance 200 specifies Instrument Set 201 comprising any non-negative number of Compound Redeemable Instruments redeeming in exchange for Asset Set 204 comprising any non-negative number of Exchangeable Assets where Interest Unit 202 comprises any numbers $r_{1-x}$ at least $r_1$ and $r_2$ positive, Multiplier v 203 represents any positive number, Asset Unit 205 comprises any number(s) $e_{1-d}$ at least $e_1$ positive and Multiplier u 206 represents any positive number. For example, the number and class of Compound Redeemable Instruments is equal to Multiplier v of 0.9 Instrument Unit 202 each comprising 10,000 shares of preferred equity, 4 senior bonds and 2 subordinated bonds, and the number and class of Exchangeable Assets 204 is equal to Multiplier u 70.2 of Asset Units comprising 30 buckets of #2 screws and 70 buckets of #8 screws. In this example the Redemption Ratio is 70.2/0.9, or 78/1.

In various embodiments of the invention, any numbers of Compound Redeemable Instruments $R_x$ 221 from more than one Interest Class $221_{1-x}$ and any numbers of Exchangeable Assets $E_d$ from at least one Asset Class $211_{1-d}$ can be specified in a Compound Redemption Instance.

In various embodiments of the invention, fractions of Instrument Sets, Instrument Units, Multiplier v's, Compound Redeemable Instruments, Asset Sets, Asset Units, Multiplier u's, and Exchangeable Assets are possible.

It is appreciated that in some individual or groupings of instances of Compound Redemption the use of cash equivalents may be used for all or a portion of a redemption instance.

In various embodiments of the invention, an issuer may create Compound Redeemable Instruments only in the case where it owns at least all of the Exchangeable Assets for which said instruments can be redeemed.

In various embodiments of the invention, an issuer may create Compound Redeemable Instruments in cases where it owns less than all of the Exchangeable Assets for which said instruments can be redeemed.

Figure 3:
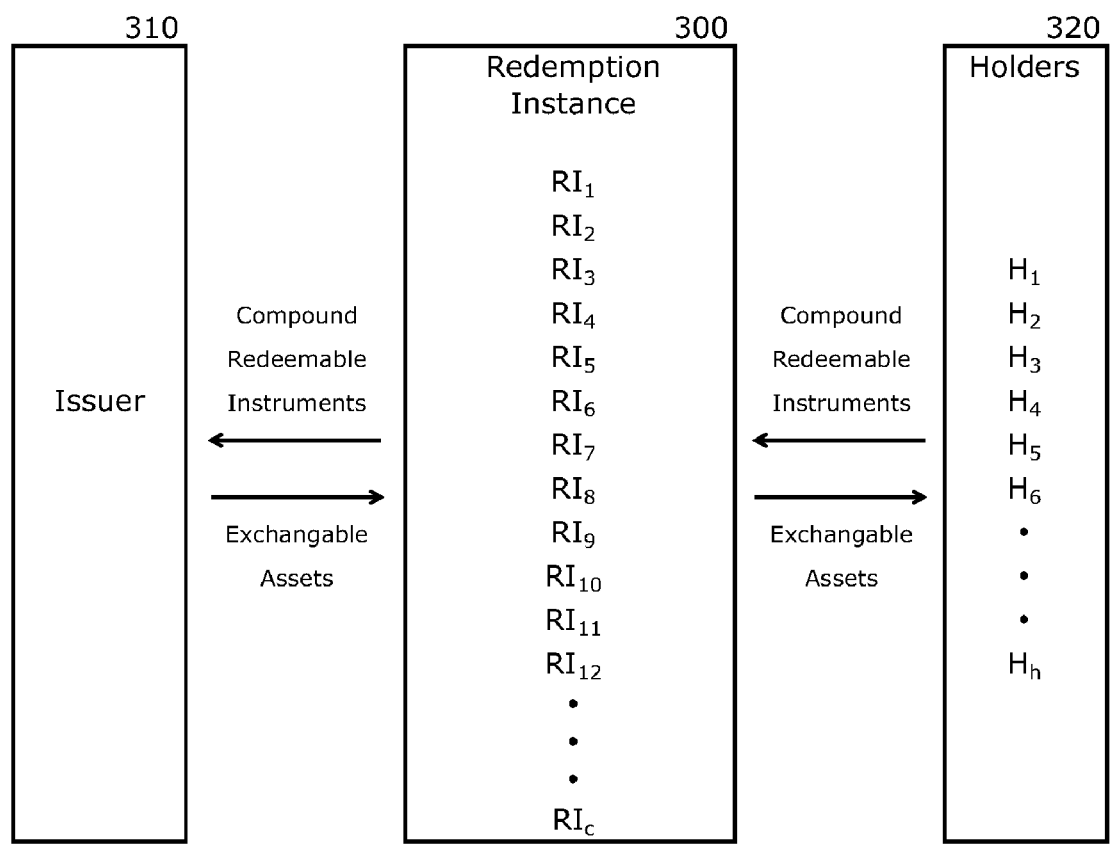
FIG. 3 illustrates some embodiments of an Issuer engaging in Redemption Instances.

Referring now to FIG. 3, with reference to FIGS. 1A and 2, configuration and system examples of various embodiments of the invention are illustrated. FIG. 3 illustrates an Issuer 310, generally equivalent to an Issuer 210 in FIG. 2, and Holders 320 comprising $H_{1-h}$ each a Holder 220 of FIG. 2 engaging in Redemption Instances 300 comprising $RI_{1-c}$ each a Redemption Instance 200 in FIG. 2.

In some exemplary embodiments, $H_h$ may be the same in different $RI_c$'s as in the case where insurance company $H_1$ is the Holder in $RI_1$ and $RI_2$, or in the case where $H_1$ is the only Holder in each of several $RI_c$'s in which it is a participant. In other exemplary embodiments, $H_h$'s may be different in different $RI_c$'s as in the case where investment fund $H_1$ participates in $RI_1$ and corporate investor $H_2$ participates in $RI_2$. In other exemplary embodiments, $H_h$'s may be different in the same $RI_c$ as in the case where sophisticated investor $H_1$ and hedge fund $H_2$ participate in $RI_1$ by each contributing Compound Redeemable Instruments 221 in FIG. 2.

In other exemplary embodiments, Issuer 310 may be a joint venture or agreement among two or more distinct entities where $RI_c$'s include Compound Redeemable Instruments $R_x$ 221 issued by one or more of such entities exchanging for Exchangeable Assets $E_d$ provided by one or more of such entities.

In other exemplary embodiments, Instrument Set 201 in FIG. 2 may be the same in more than one $RI_{1-c}$ as in the case where the Instrument Set comprises 50 common shares and ten warrants of Issuer in each of $RI_{1-512}$. In still other exemplary embodiments, Instrument Set 201 in FIG. 2 may be different in more than one $RI_{1-c}$ as in the case where the Instrument Set Comprises 40 common shares and 20 preferred shares of Issuer in each of $RI_{1-200}$ and 41 common shares and 20 preferred shares of Issuer in each of $RI_{201-204}$.

In other exemplary embodiments, Asset Set 204 in FIG. 2 may be the same in more than one $RI_{1-c}$ as in the case where the Asset Set comprises 50 silver coins of a single type in each of $RI_{1-20,000}$. In other exemplary embodiments, Asset Set 204 may be different in more than one $RI_{1-c}$ as in the case where the Asset Set Comprises 48 silver coins of a single type in each of $RI_{1-2300}$, 47 silver coins of the same type in each of $RI_{2301-3333}$ and 46 silver coins of the same type in each of $RI_{3334-5000}$.

In other exemplary embodiments, Instrument Unit 202 in FIG. 2 may be the same in more than one $RI_{1-c}$ as in the case where the Instrument Unit comprises 7 preferred shares, 1 bond and one contract of Issuer in each of $RI_{1-10,000}$. In other exemplary embodiments, Interest Unit 202 in FIG. 2 may be different in more than one $RI_{1-c}$ as in the case where the Instrument Unit comprises 2 common shares and 1 preferred share of the Issuer in $RI_{1-100}$, 300 common shares and 2 bonds of the Issuer in each of $RI_{1-1,000}$, 2 common shares and 1 preferred share of the Issuer in each of $RI_{1,001-1,100}$.

In other exemplary embodiments, Asset Unit 205 in FIG. 2 may be the same in more than one $RI_{1-c}$ as in the case where the Asset Unit comprises 1 U.S. Treasury Bond in each and every $RI_c$. In other exemplary embodiments, the Asset Unit 205 in FIG. 2 may be different in more than one $RI_{1-c}$. In furtherance of this exemplary embodiment, the Asset Unit Comprises 3 shares of ABC Company stock, 5 shares of XYZ Company stock and 3 gold coins in some $RI_c$, and 9 shares of ABC Company stock, 1 share of GHI Company stock and 1000 silver coins in every other $RI_c$.

In other exemplary embodiments, Multiplier v 203 in FIG. 2 may be the same in more than one $RI_{1-c}$ as in the case where Multiplier v is 1.0 in each of $RI_{1-25}$. In other exemplary embodiments, Multiplier v 203 in FIG. 2 may be different in more than one $RI_{1-c}$ as in the case where Multiplier v is 0.9999 in each of $RI_{26-60}$ and 0.99985 in each of $RI_{61-85}$.

In other exemplary embodiments, Multiplier u 206 in FIG. 2 may be the same in more than one $RI_{1-c}$ as is the case where Multiplier u is 10.0 in each of $RI_1$, $RI_7$ and $RI_{28}$. In other exemplary embodiments, Multiplier u 206 in FIG. 2 may be different in more than one $RI_{1-c}$ as is the case where Multiplier u is 7 in $RI_1$, 6 in $RI_{702}$, 5 in $RI_{1500}$ and 4.3 in $RI_{2223}$.

In other exemplary embodiments, Multiplier u 206 and Multiplier v 203 and coefficients $r_{1-x}$ and $e_{1-d}$ all equal to 1 in more than one $RI_{1-c}$ as is the case where Multiplier u is 1, Multiplier v is 1, coefficient $r_1$ is 1, coefficient $r_2$ is 1, coefficient $e_1$ is 1 and all other coefficients are 0 in every $RI_c$. By way of further example involving ETNs in some embodiments, ETNs are jointly redeemable for one amount of cash specified to be an index, such as $E_1$. Alternatively, $E_1$ can be a fixed amount and a coefficient $e_1$ varies with an index. Alternatively, $e_1$ and $E_1$ can be pre-specified in order to provide a fixed schedule of redemption amounts such as One Hundred Dollars U.S. ($100.00) this year and One Hundred Five Dollars U.S. ($105.00) a following year.

In other exemplary embodiments, one or more of the Instrument Set 201, Asset Set 204, Instrument Unit 202, Asset Unit 205, Multiplier v 203 and Multiplier u 206 in FIG. 2 may not change in a subsequent $RI_c$ as is the case where each of the Instrument Set, Asset Set, Instrument Unit, Asset Unit, Multiplier v and Multiplier u is the same in $RI_3$ as it was in $RI_2$ where $RI_3$ is subsequent to $RI_2$.

In other exemplary embodiments, one or more of the Instrument Set 201, Asset Set 204, Instrument Unit 202, Asset Unit 205, Multiplier v 203 and Multiplier u 206 in FIG. 2 may change in a subsequent $RI_c$ on an arbitrary basis as is the case where Multiplier u 206 is 10 in $RI_1$, 9 in $RI_2$ and 11 in $RI_3$ where $RI_3$ is subsequent to $RI_2$ and $RI_2$ is subsequent to $RI_1$.

In other exemplary embodiments, one or more of the Instrument Set 201, Asset Set 204, Instrument Unit 202, Asset Unit 205, Multiplier v 203 and Multiplier u 206 in FIG. 2 change in a subsequent $RI_c$ on a specified basis as in the examples where Multiplier v 203 is increased or decreased in subsequent $RI_c$ to reflect the actual expenses or income of Issuer 210 in FIG. 2 or Instrument Unit 202 is changed to reflect a change to a Compound Redeemable Instrument $R_x$ 221 such as a corporate event as in a share split of an instrument included in such Interest Unit.

In other exemplary embodiments, Holder $H_h$ 320 initiates $RI_c$. In furtherance of this exemplary embodiment, $H_h$ provides Issuer 310 with a Redemption Notice 401 FIG. 4 (discussed further below) to initiate a $RI_c$. In other exemplary embodiments, Issuer 310 initiates $RI_c$. In furtherance of this exemplary embodiment, Issuer provides one or more Holders with a Redemption Notice to initiate a $RI_c$.

The various elements of a system of Compound Redemption is illustrated in FIGS. 1B, 2 and 3 and may be expressed in unique controlling logic resident on or implemented with any of one or more computers, e.g. servers, which in turn may be connected to other computers or computer networks such as those including but not limited to the World Wide Web, the Internet, any suitable local area network (LAN), and/or any suitable wide area network (WAN), a virtual private network (VPN), Integrated Services Digital Network (ISDN or other type of distributed network.

Further, the various functionalities of the systems and methods described herein may be implemented by suitable hardware, firmware, and/or software (e.g. such as those useful for computer, telephony, and/or internet applications). Examples of computer systems incorporating the system of Compound Redemption are outlined in FIGS. 8 and 9.

Methods

Figure 4:
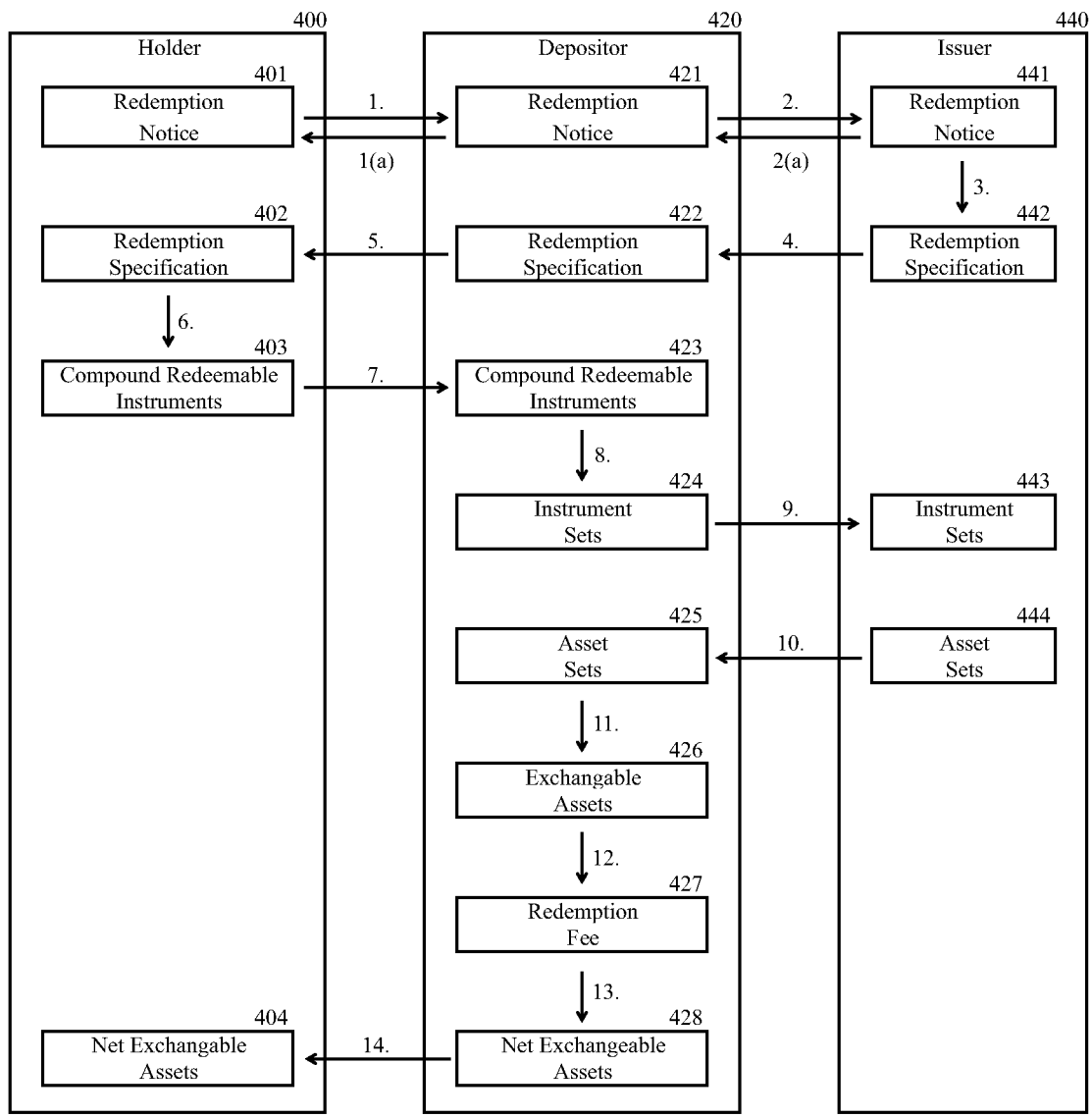
FIG. 4 illustrates a flow chart with some exemplary methods of redeeming Compound Redeemable Instruments in exchange for Exchangeable Assets.

Referring now to FIG. 4, a flow chart illustrates methods of redeeming of Compound Redeemable Instruments via Redemption Instances in exchange for Exchangeable Assets according to some specific embodiments of the invention. Holder 400 redeems Compound Redeemable Instruments 403 from Issuer 440 using Depositor 420, the Issuer, an affiliate of the Issuer, or an unrelated third party.

Communications and method steps describe herein may be accomplished via a network access device, such as a personal computer, a computer terminal, a mobile phone, a personal digital device or other apparatus capable of communicating via a distributed network in logical communication with a server or other Compound Redemption Processor involved in the methods described.

At a first step 1 Holder 400 submits Redemption Notice 401 to Depositor 420 specifying Holder's 400 intent to redeem an indicative number and class of Compound Redeemable Instruments 403 by effecting one or more Redemption Instances 200. Depositor 420 accepts Redemption Notice 401 as Redemption Notice 421 or rejects it for incompleteness and returns it to Holder in step 1(*a*). At a second step 2 Depositor submits Redemption Notice 421 to Issuer 440 specifying Holder's intent to redeem indicative number of Compound Redeemable Instruments by effecting one or more Redemption Instances 200. Issuer 440 accepts Redemption Notice 421 as complete Redemption Notice 441 and proceeds to a third step 3 or rejects it for incompleteness and returns it to Depositor in a Step 2(*a*) who then completes it and returns it in step 2 or returns it to Holder in a Step 1(*a*).

In a third step 3, Issuer revises, if necessary, the specifications of Redemption Instances 200 of FIG. 2 and produces Redemption Specification 442 confirming for execution the terms of Compound Redemption Instances 200 of FIG. 2. Issuer then forwards said Redemption Specification to Depositor in a fourth Step 4 who accepts it as Redemption Specification 422 and forwards it in step 5 to Holder who accepts it as Redemption Specification 402.

In a sixth step 6 Holder assembles the proper number and classes of Compound Redeemable Instruments 403 according to Redemption Specification 402 and tenders them in a seventh step 7 to Depositor who accepts them as Compound Redeemable Instruments 423.

In an eighth step 8 Depositor groups Compound Redeemable Instruments into Instrument Sets 424 which are then tendered in a ninth step 9 to the Issuer who accepts them as Instrument Sets 443 in exchange for Asset Sets 444 which Issuer distributes to Depositor in step 10 who accepts them as Asset Sets 425. It will be appreciated that in alternative embodiments of the present invention, the Issuer may retain, extinguish or reissue the Compound Redeemable Instruments received as Instrument Sets.

In an eleventh step 11 the Depositor disassembles Asset Sets 425 into Exchangeable Assets 426 and retains a portion of said Exchangeable Assets in step 12 as Redemption Fee 427. In a thirteenth step 13 the Net Exchangeable Assets 428 are assembled for distribution and are distributed in fourteenth step 14 to Holder who receives them as Net Exchangeable Assets 404.

It will be appreciated that in alternate embodiments of the present invention, a Depositor may receive from a Holder or distribute to a Holder amounts of cash either incremental or for the entire amounts deposited or withdrawn in order to facilitate Compound Redemption including for the payment of any Redemption Fee. Furthermore, it will be appreciated that in alternate embodiments of the present invention, the Depositor may acquire Compound Redeemable Instruments and act as redeeming Holder on behalf of a third party providing cash to the Depositor in exchange for Exchangeable Assets.

Figure 8:
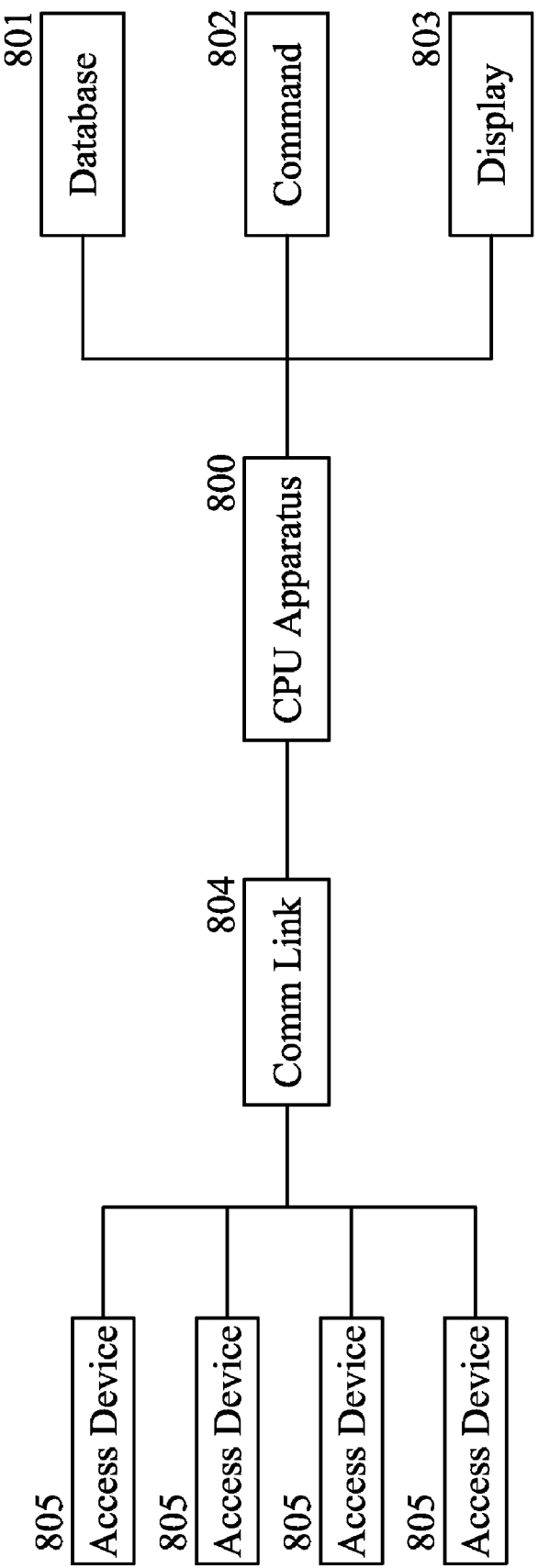
FIG. 8 illustrates a block diagram of a components included in some embodiments the invention.
Figure 9:
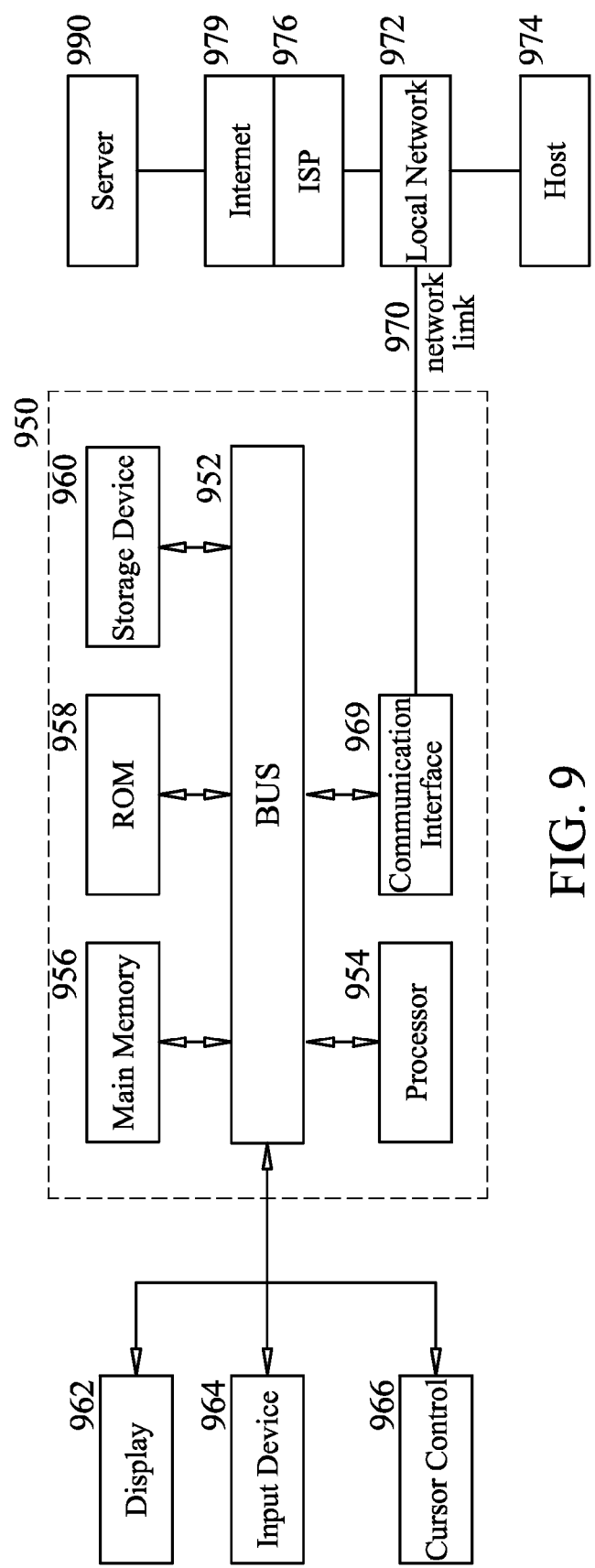
FIG. 9 illustrates a block diagram of CPU apparatus included in some embodiments the Present invention.

It will also be appreciated that in alternate embodiments of the present invention, these steps described and associated with FIG. 4 through FIG. 7B, or otherwise discussed in conjunction with the present invention are automated through one or more computer systems including apparatus and executable code that may be executed upon command. FIGS. 8 and 9 illustrate exemplary computer systems that may be used to implement functionality and method steps presented herein.

Figure 5:
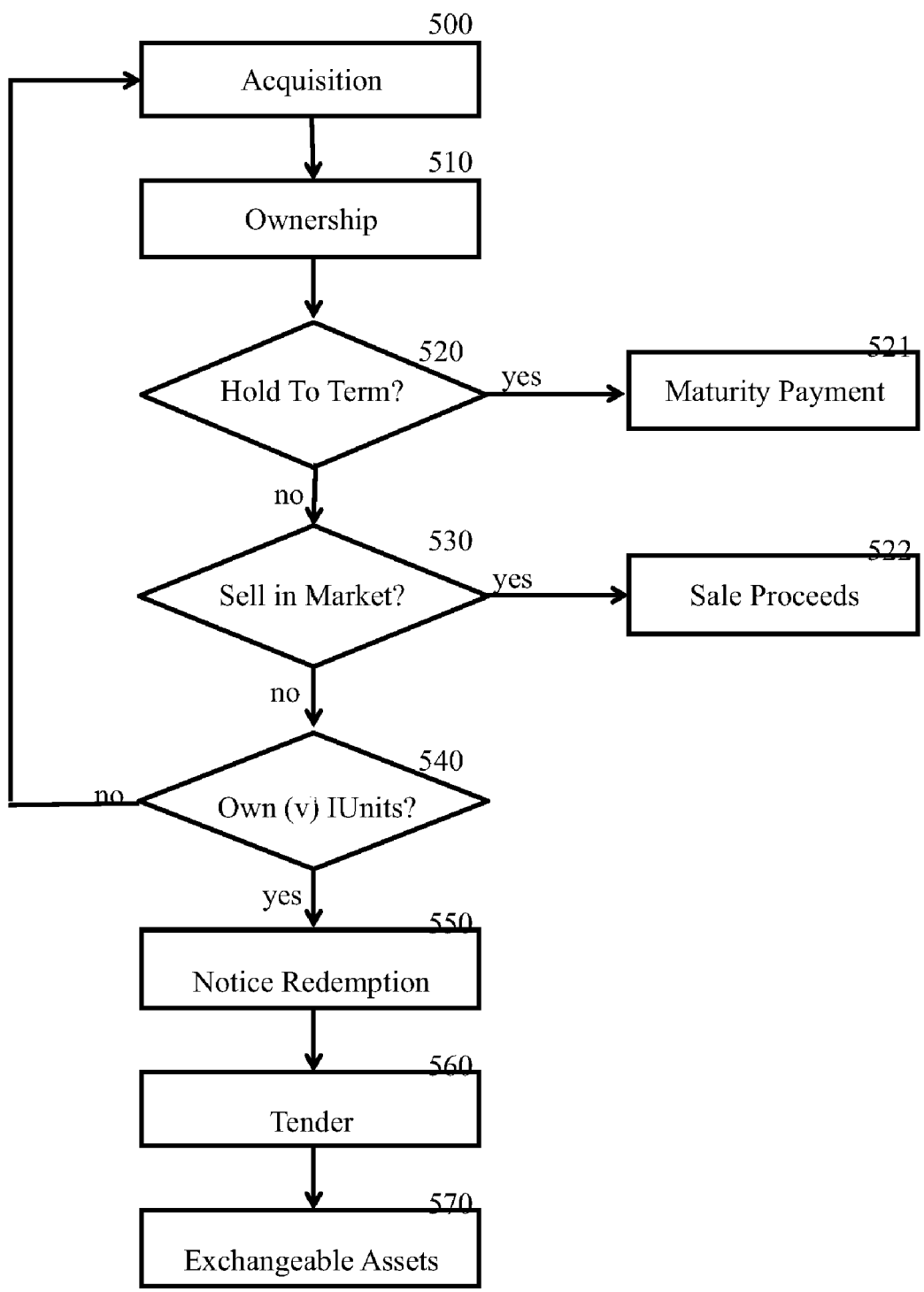
FIG. 5 illustrates steps that may be included, in some embodiments relating to acquisition, ownership and disposition of Compound Redeemable Instruments.

Referring now to FIG. 5, a flow chart illustrates steps that may be included, in some embodiments of the present invention relating to acquisition, ownership and disposition of Compound Redeemable Instruments 221 by Holder 220 in a specific embodiment of the present invention.

Beginning with step 500 Holder 220 acquires Compound Redeemable Instruments 221 through one or more of transformation, issuance or purchase. Holder 220 may acquire Compound Redeemable Instruments through transformation by Issuer 210 at step 500 whereby Instruments 120 previously acquired by Holder 220 become Compound Redeemable Instruments 221 during the time that Holder 220 holds them.

Alternatively, Holder 220 may acquire Compound Redeemable Instruments 221 through issuance at step 500 whereby Holder 220 becomes a holder by contributing cash or Exchangeable Assets 211 to Issuer 210 in exchange for Compound Redeemable Instruments 221. This can occur for example, by essentially running the system of Compound Redemption illustrated in FIG. 2 in reverse, such that in an instance of creation, the Holder can deposit one Asset Set of Exchangeable Assets in order to receive one Instrument Set in Compound Redeemable Instruments. Alternatively, many such instances of creation can be conducted simultaneously or sequentially in order that a Holder may come to own Compound Redeemable Instruments.

In another method of acquisition, Holder 220 may acquire Compound Redeemable Instruments 221 through purchase at step 500 whereby Holder 220 acquires for consideration such as cash from another Holder 220 either in an organized marketplace or otherwise Compound Redeemable Instruments 221. The marketplace may be a public marketplace such as a stock exchange or may be a private marketplace such as the NASDAQ PORTAL Alliance System. In addition, Compound Redeemable Instruments may be acquired through private placement, negotiated transaction, or otherwise.

In some embodiments, an issuer may require that one method or another be used exclusively in causing holders to come to own Compound Redeemable Instruments. In some embodiments, an issuer may allow that more than one method be used in causing holders to come to own Compound Redeemable Instruments.

At step 510 Holder 220 owns Compound Redeemable Interests 221 entitling Holder 220 to the benefits and obligations of ownership including any voting rights, collateral rights, rights to receive payments, transfer rights, limited liability, obligations to make payments and post collateral, ownership restrictions and essentially any and all rights and obligations to which the holder of a particular instrument may be entitled or obligated depending on the structure of that instrument.

By way of example, if the Compound Redeemable Instrument is a listed equity interest the Holder 220 may be entitled to voting rights and dividend income. In another example, if the Compound Redeemable Instrument 221 is a convertible debt instrument, the Holder 220 is entitled to coupon payments, conversion rights and call protection among others. In another example, if the Compound Redeemable Instrument 221 is a swap agreement the Holder 220 might have the right to receive and the obligation to make periodic payments.

At step 520 Holder 220 may elect to hold the Compound Redeemable Instrument 220 throughout its term and receive a payment in the form of a Maturity Payment 521, if any, depending on a structure of the Compound Redeemable Instrument. Alternatively, Holder 220 may elect to Sell In Market 530 and receive Sale Proceeds 522.

Alternatively, Holder 220 may proceed to a next decision point 540 and a determination is made as to whether Holder 220 owns a proper number of Instrument Units to be able to redeem Compound Redeemable Instruments for Exchangeable Assets. In the event that a "no" answer is received, the Holder may proceed to 500 to acquire instruments required to redeem. In the event that a "yes" answer is received, the Holder may proceed to step 550 and submit a Notice of Redemption to Issuer 210 followed by the step 560 which includes tendering of Compound Redeemable Instruments 221 to Issuer 210 and step 570 which is the receipt from Issuer 210 of Exchangeable Assets 211. Holder 220 tenders the proper number and class of Compound Redeemable Instruments 221 comprising Instrument Units 202 deposited with Issuer 210 in exchange for the proper number and class of Exchangeable Assets 211 comprising Asset Units 205 withdrawn from Issuer 210.

Steps 550, 560 and 570 may utilize a Depositor 420 as an intermediary between Holder 400 and Issuer 440. The Depositor may be an unaffiliated third party such as a broker dealer or may be an affiliate of the Issuer or the Issuer itself. The Depositor may receive from the Holder or distribute to the Holder incremental amounts of cash in order to facilitate the redemption of Instrument Units in exchange for Exchangeable Assets. It will be appreciated that in alternate embodiments of the present invention, the Depositor may acquire Compound Redeemable Instruments and act as redeeming Holder on behalf of a third party providing cash to the Depositor in exchange for Exchangeable Assets.

Implementing the steps for investing in Compound Redeemable Instruments mandate a communications mechanism between the various entities referenced in FIG. 5. This communications mechanism encompasses any and all techniques for conveying information from one place to another including, for example, wireless communications, wired communications, computer networks, fiber optics, and others.

Figure 5A:
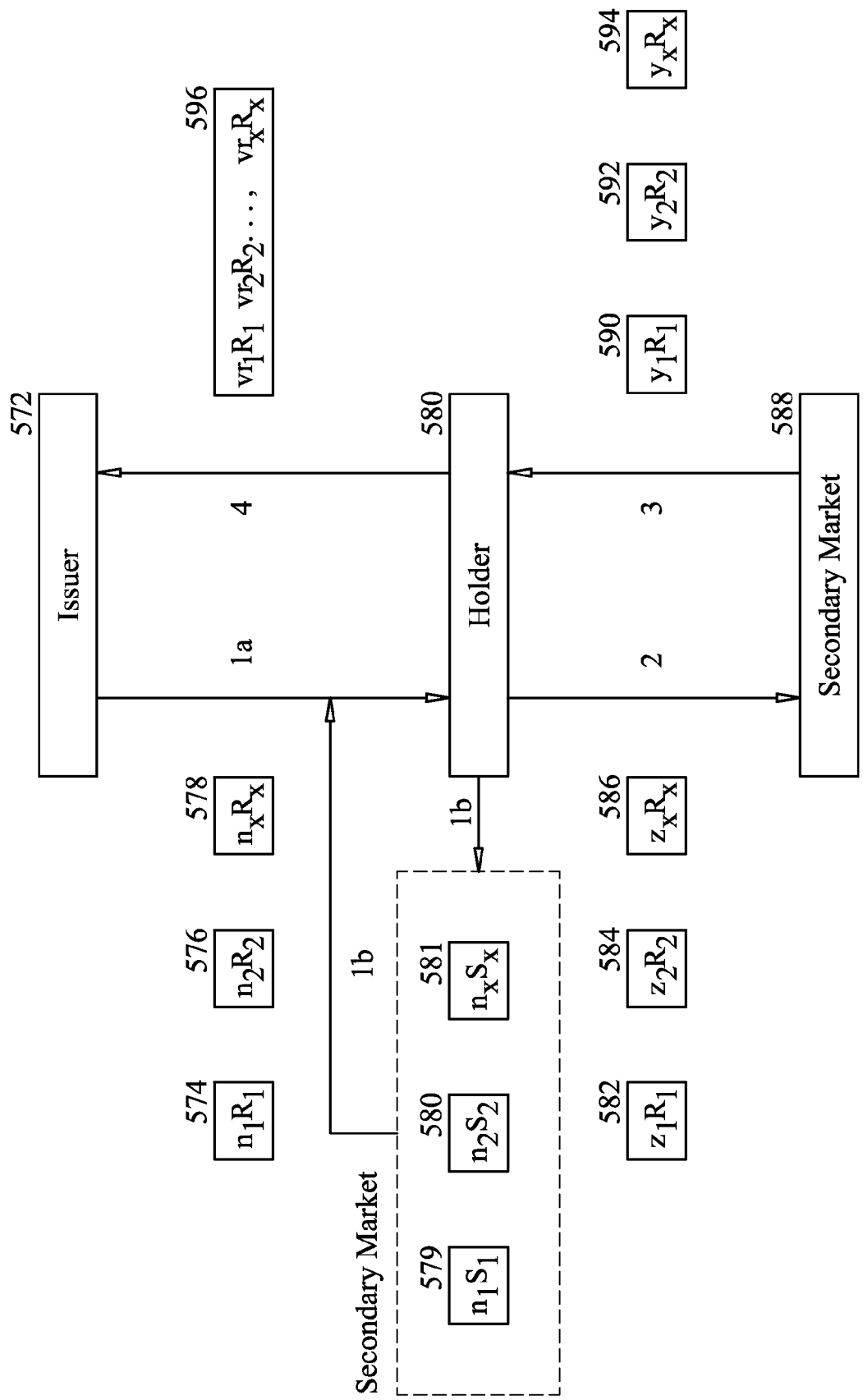
FIG. 5A illustrates some alternative embodiments of the present invention.

Referring now to FIG. 5A, a flow diagram illustrates steps relating to acquisition, ownership, and disposition of Compound Redeemable Instruments by Holder 220 in one exemplary embodiment of the present invention.

At Step 1 Issuer 572 in FIG. 5A generally equivalent to issuer 210 in FIG. 2 issues Compound Redeemable Instruments 574, 576 and 578 each from a separate class 221*x* of Compound Redeemable Instruments to Holder 573, which may be considered generally equivalent to Holder 220, for cash or Exchangeable Assets 211 or otherwise. Alternatively, Holder 573, the owner of instruments 579, 580 and 581 120*x* becomes the owner of Compound Redeemable Instruments in Step 1*b* through the transformation of instruments that are not compound redeemable into instruments that are compound redeemable. Alternatively, Holder 573 acquires Compound Redeemable Instruments 590, 592 and 594 in Step 3 through secondary market purchase.

At Step 2, Holder 573 disposes of Compound Redeemable Instruments 582, 584 and 586 via a secondary market sale. Alternatively, in Step 4, Holder 573 redeems Instrument Set 596 equivalent to Instrument Set 201 in FIG. 2 through the process of Compound Redemption.

Figure 6:
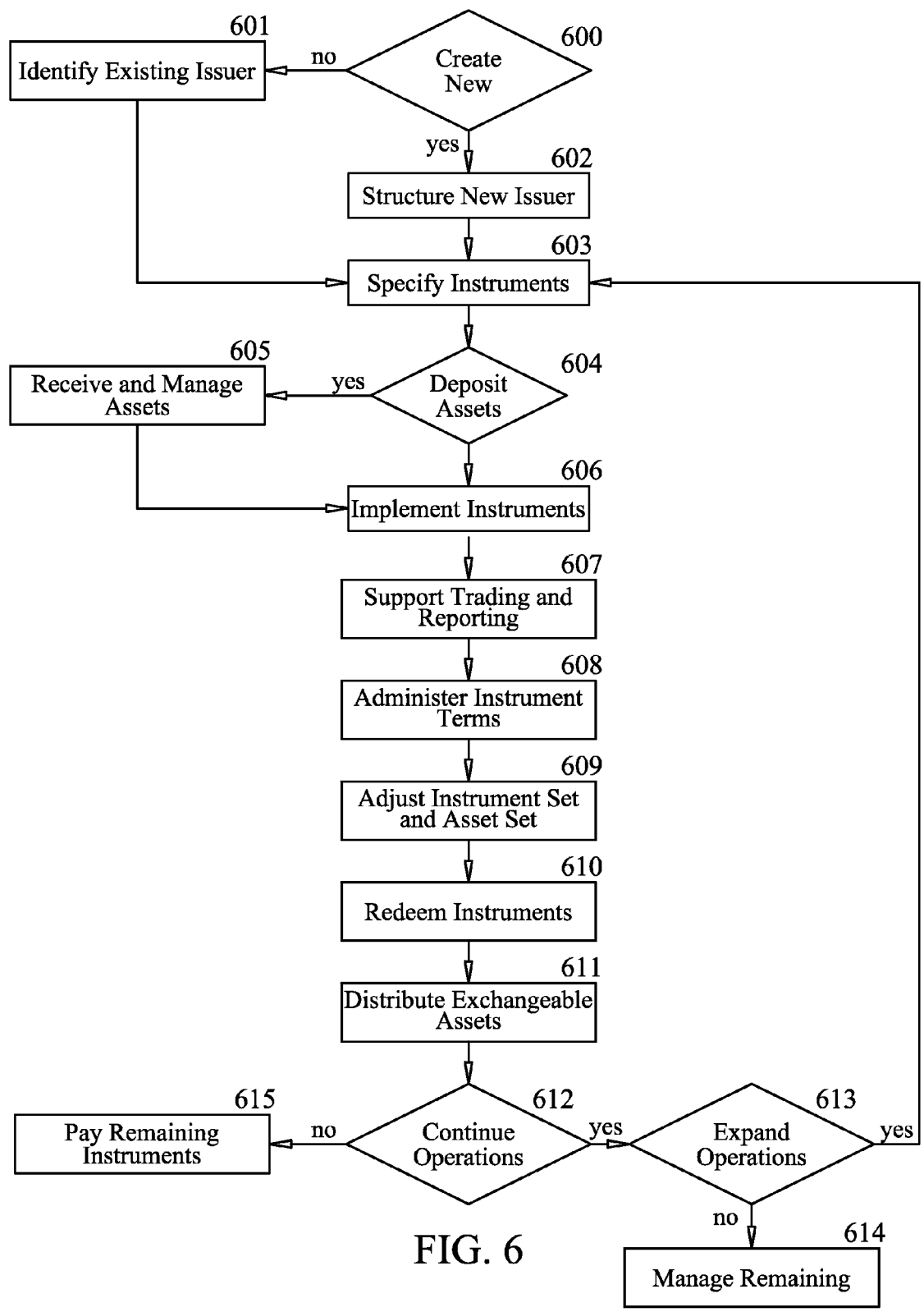
FIG. 6 illustrates a flow chart illustrates some methods of creating, redeeming, managing, administering, and extinguishing Compound Redeemable Instruments according to some embodiments of the present invention.

Referring now to FIG. 6, flow chart illustrates a method of creating, redeeming, managing, administering, and extinguishing Compound Redeemable Instruments 221 according to some embodiments of the present invention and generally from the perspective of a CRI system proprietor.

Compound Redeemable Instruments may be publicly or privately offered for sale. The instruments may be purchased and sold in packages or independently. For example, the instruments may be offered via the same channels as private placements sold to individuals or institutions or offered via the same channels as publicly available stocks, funds, bonds, and so on. The instruments may be offered on any of a variety of public or private, foreign or domestic exchanges. For example, instruments may be offered on the NASDAQ PORTAL Alliance System, NYSE, American Stock Exchange, or any of a number of exchanges, or information pages such as Bloomberg pages or Reuter's pages as will be appreciated by those skilled in the art. The instruments may be offered by any number of financial institutions such as banks, investment firms, brokers, and the like.

In some embodiments, several entities may play different roles in creating instruments, managing collateral backing instrument, managing exchangeable assets or other collateral backing Instrument Sets, brokering instruments, and so forth. Various types of instruments which may or may not be regulated by securities law are included for reference in the attached exhibits.

At 600 an initial depositor or creator, such as a sponsor, promoter, investment banker or issuer evaluates creating a new Issuer to offer Compound Redeemable Instruments considering whether the instruments will satisfy investor needs or issuer needs primarily. If the determination is not to create a new issuer, step 601 comprises activities to identify an existing operating company, special purpose vehicle or other entity as Issuer 210 issuing new Compound Redeemable Instruments or converting existing instruments that are not Compound Redeemable Instruments into Compound Redeemable Instruments.

In some embodiments, the issuer is identified in part based on its ability to benefit from Compound Redeemable Instruments including generating fees, improving the liquidity of its issuances and increasing market interest of its offerings, among others.

If the determination is to create a new issuer, step 602 comprises investment-banking activity aimed at structuring and creating Issuer 210 issuing new Compound Redeemable Instruments. This process contemplates considerations of market demand, legal, tax, regulatory and other issues affecting the proper structuring of the issuer.

At 603, Issuer 210 specifies Compound Redeemable Instruments. In one example, an issuer is a new special purpose vehicle and the instruments specified are a single class of equity and a single class of debt each to be issued as Compound Redeemable Instruments 221. In another example, an issuer is an existing corporation with one class of equity and one class of convertible bonds outstanding that the issuer specifies to be Compound Redeemable Instruments 221. Step 603 also includes specifying Instrument Units 202, Exchangeable Assets 211 and Asset Units 205.

Selection of instruments, and redemption features, including backing Compound Redeemable Instruments with Exchangeable Assets or other collateral, may be determined in order to be attractive to the marketplace. Such collateral may be separate and apart from any collateral associated with any individual instrument or asset individually.

At 604, a determination is made to require the deposit of Exchangeable Assets or other collateral to back the issuer's obligation to redeem Compound Redeemable Instruments. This involves analyzing the investment characteristics of said assets including whether the assets are hard assets or financial assets and any applicable factors such as liquidity, transferability, maturity, coupons, dividends, settlement, payment dates, ratings and market capitalization and estimates as to the timing and amount of payments produced under a variety of scenarios. If the determination is yes, said assets are received and managed by the issuer or its agent in step 605. In the case of newly issued Compound Redeemable Instruments, the issuer may receive assets or the cash equivalent amount used to acquire assets in this step. In the case of existing instruments which may not initially be Compound Redeemable Instruments but are converted into Compound Redeemable Instruments, the issuer may use existing funding to acquire said assets. The management of the assets is effected by the issuer or a representative of the issuer and may include active management, passive management or no management at all. If the determination in step 604 is not to deposit assets then the issuer's obligation to redeem Instrument Sets may be based on the issuer's credit, a third party guarantee or otherwise.

At 606, the Compound Redeemable Instruments 221 are implemented in the marketplace. In the case of newly issued Compound Redeemable Instruments, the instruments are distributed into the marketplace by offering or otherwise. In the case of existing instruments that are not Compound Redeemable Instruments, but that are converted into Compound Redeemable Instruments, these instruments become Compound Redeemable Instruments 221 in this step.

At 607, the issuer supports trading, tracking and reporting of Compound Redeemable Instruments 221. This includes the use of electronic computing and networking technologies enabling automated means to perform computation and data processing to support the trading of Compound Redeemable Instruments and reporting of financial documents, financial analysis, market-based valuations, computerized redemption and creation support, and support for various markets including options, futures and lending products and markets tied to Compound Redeemable Instruments.

At 608, the issuer administers terms of instruments. Terms may include making payments due under the terms of Compound Redeemable Instruments 221. The payments may include interest payments, dividend payments, swap payments, payments in settlement of options or contracts or any other distributions required under the terms of the Compound Redeemable Instruments.

At 609, the issuer makes adjustments, if any, to the Instrument Set and Asset Set. Adjustments may be based on changes to the underlying Compound Redeemable Instruments 221 for corporate events including splits, payments in kind, liquidating dividends, net settlement of contracts or any other events that impact the make-up of Instrument Units. They may also be based on changes to the underlying Exchangeable Assets. For financial assets this might include corporate events including, for example: splits, payments in kind, liquidating dividends, net settlement of contracts or other events that impact the make-up of Asset Units.

In the case of hard assets, it might include adjustments for spoilage, carrying costs, insurance, damages or others that impact the make-up of Asset Units. Also in step 609, the issuer adjusts or doesn't adjust the multipliers u 206 and v 203 indicating the number of Asset Units 205 in the Asset Set redeeming per number of Instrument Units 202 in the Instrument Set. For example the issuer may change these on a regular basis to reflect its income or expenses for administrative or other reasons, including those associated with holding Exchangeable Assets or other assets. Alternatively, some or all of the multipliers u and v, the Instrument Unit and the Asset Unit may be fixed such that no periodic or other adjustments or determinations are necessary. Alternatively, some or all of the multipliers u and v, the Instrument Unit and the Asset Unit may be fixed such that no periodic or other adjustments or determinations are permitted. Alternatively, some or all of the multipliers u and v, the Instrument Unit and the Asset Unit may be fixed such that no periodic or other adjustments or determinations or are permitted other than in specified situations.

At 610, the issuer redeems Compound Redeemable Instruments 221 in exchange for Exchangeable Assets 211 based on the Redemption Ratio number of Asset Units 205 comprising Exchangeable Assets 211 or the cash equivalent thereof or both for Instrument Units 202 comprising Compound Redeemable Instruments 221 or the cash equivalent thereof or both. The day-to-day operation of the system including various aspects of step 609 is illustrated in detail in FIG. 12.

At 611, the issuer distributes Exchangeable Assets 211 or the cash equivalent thereof or both to the Holder 220 of the Compound Redeemable Instruments redeeming.

At 612, the determination is made to continue the operations of the Issuer 210. If the determination is made to not continue operations, remaining Compound Redeemable Instruments are paid in step 615 and the Issuer's use of Compound Redeemable Instruments is terminated. If the determination is made to continue operations then determination may be made in step 613 to expand operations or to not expand operations. If the determination is made to expand operations then the process is re-started at step 603. In the event that the determination is made to not expand operations then any remaining Compound Redeemable Instruments and associated assets, if any, are managed for the benefit of any remaining Holders until the expiration, if applicable, of said Compound Redeemable Instruments. If the determination is made to not expand operations then management of remaining instruments continues in 614.

In some embodiments, in order to keep the Compound Redeemable Instruments as competitive instruments in the marketplace, an issuer of Compound Redeemable Instruments may, from time to time, reset the terms of the Compound Redeemable Instruments through corporate actions or otherwise. For example, this may be done periodically or in response to economic factors that undesirably alter the attractiveness of the Compound Redeemable Instruments as an investment. This resetting may be done for example to reduce the cost of a Compound Redeemable Instrument that is a share of stock through a stock split. Such an event will have ramifications for the determinants of Compound Redemption requiring adjustments within the system. For example, the coefficients of the Instrument Unit, Asset Unit or Redemption Ratio might require adjustment as a result.

Various embodiments may also include mechanisms for adjusting the holdings of Exchangeable Assets by the issuer to a level that insures its ability to make good on Compound Redemptions as they occur. For example the minimum ratio of Asset Sets to Instrument Sets may be 100% in the case of an issuer that is a special purpose vehicle intended to have no credit risk. Alternatively, an operating business issuer with a strong credit rating and ready access to financing might deem a ratio of Asset Sets to Instrument Sets on hand of 10% to be sufficient. Accordingly, in either case, some embodiments may include an automatic asset purchase plan implemented as an automated part of the system to insure that the proper level is maintained.

In still other embodiments, the function of establishing the Compound Redeemable Instruments and the Redemption Instances may be accomplished and managed by the Compound Redemption Processor in accordance with those methods outlined in example of FIG. 6. The operation of this system mandates a communications mechanism between the various entities identified in FIG. 6. This communications mechanism encompasses any and all apparatus for conveying information from one place to another including, for example, wireless communications, wired communications, computer networks, fiber optics, and others.

Figure 7A:
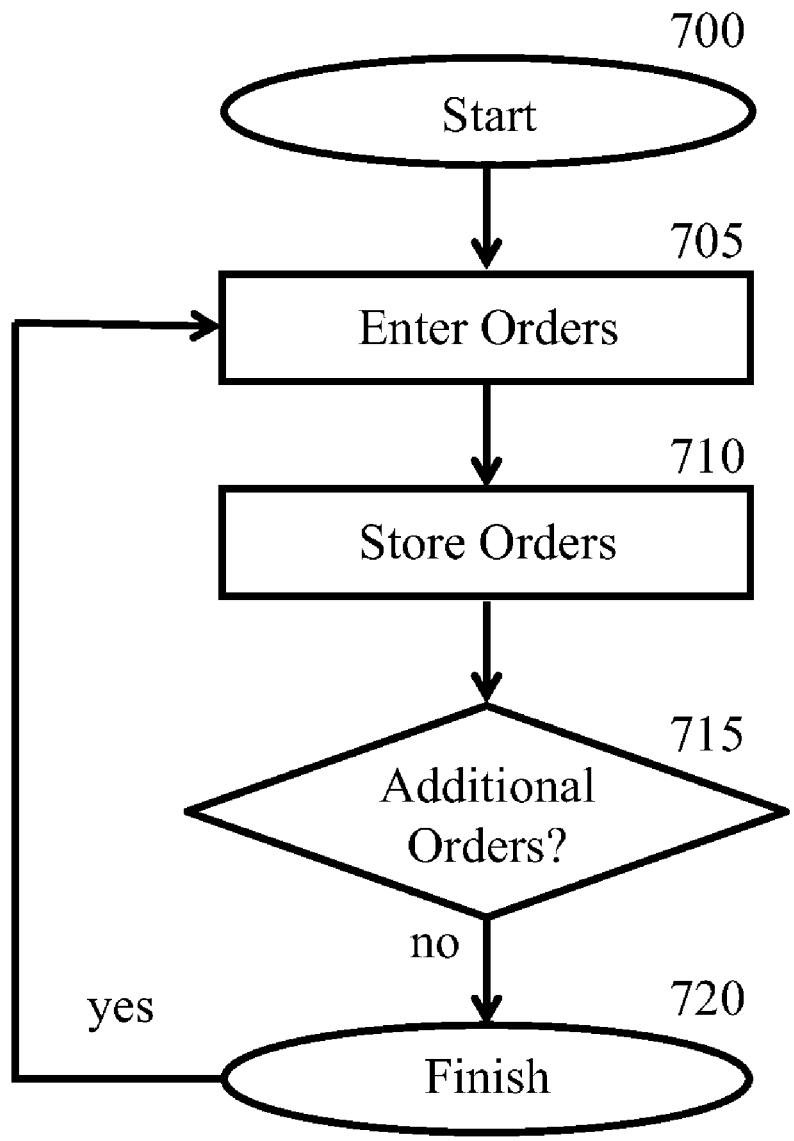
FIG. 7A illustrates method steps that can be included in some embodiments of the present invention.
Figure 7B:
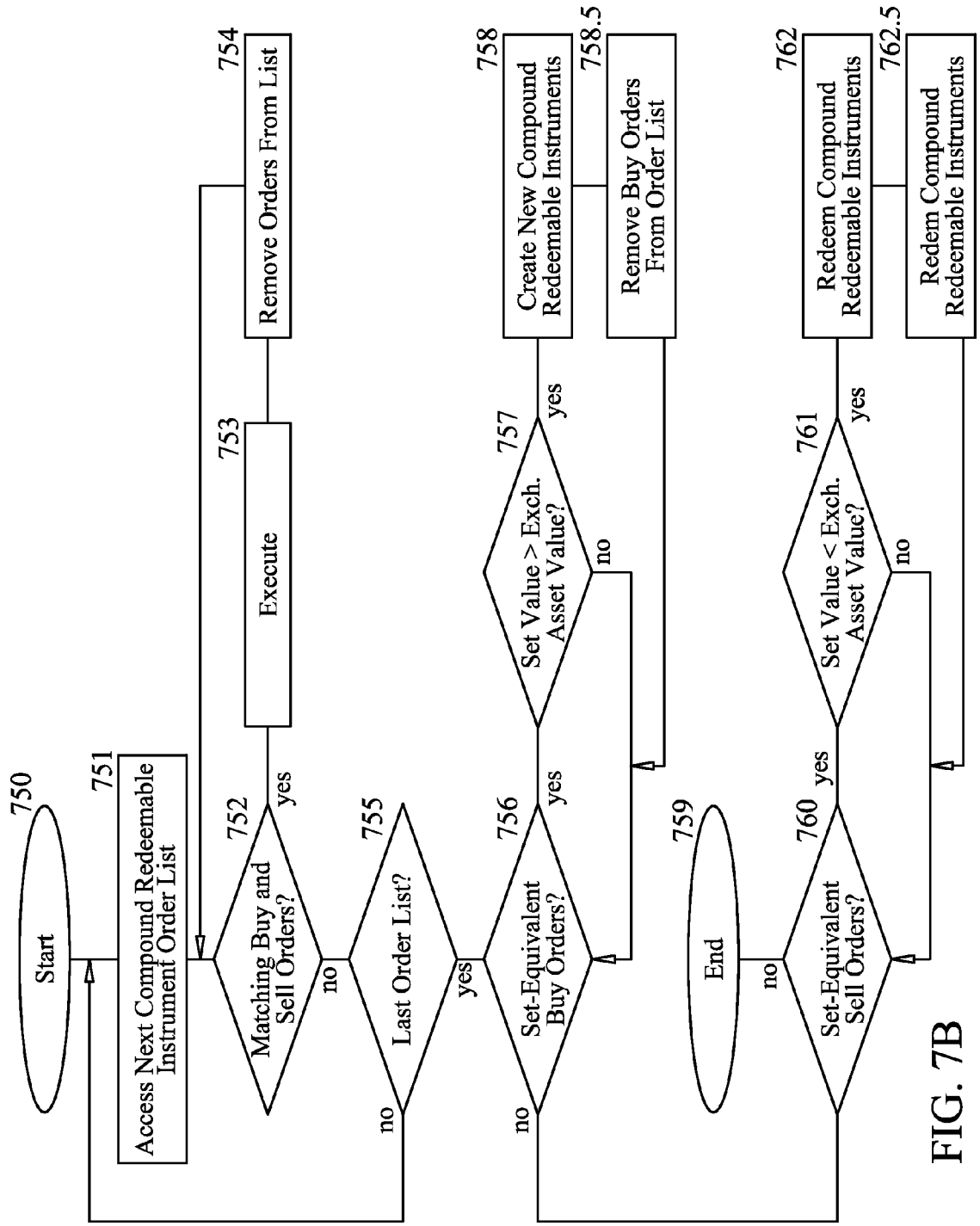
FIG. 7B illustrates some additional method steps that may be implemented in some embodiments of the present invention.

Referring now to FIGS. 7A and 7B, according to various embodiments of the present invention, execution of orders by issuance, redemption or matching and clearing of buy and sell orders for Compound Redeemable Instruments can be accomplished by processing logic and control commands such as those illustrated in FIGS. 7A and 7B.

FIG. 7A illustrates some exemplary embodiments in the form of a logic flow chart depicting the Instrument Order Processor. Beginning at start 700 in FIG. 7A, the order entry subroutine is detailed. Orders are received at 705 from investors or brokers via access devices such as workports, telephone, telefax, internet or other access devices 805 or internet link 970. Orders may consist of market orders (to buy or sell a specific number of a specific Compound Redeemable Instrument at any price) or limit orders (to buy a specific number of Compound Redeemable Instruments at or below a certain price or to sell a specific number of Compound Redeemable Instruments at or above a certain price), bids and offers, hits and takes, or possibly other kinds of orders.

Data descriptive of buy and sell orders is stored at 710 in a pending order list for each Compound Redeemable Instrument in what is essentially equivalent to a book window in the trading system. In some embodiments, the buy and sell orders are arranged in the book window with the highest bid at the top of one column and the highest offer at the top of another column, with prices listed in descending value. At 715, additional orders may be considered and at 720, the process will finish.

Referring now to FIG. 7B, some exemplary embodiments are illustrated including a Compound Redeemable Instrument trading, issuance and redemption system. As illustrated, the system begins at 750. In a subroutine beginning at 751, pending order lists corresponding to each Compound Redeemable Instrument are individually accessed and searched. At 752, if a buy order for a Compound Redeemable Instrument is matched with an identical sell order for a Compound Redeemable Instrument, those instruments are traded at 753 without the creation or redemption of any additional Compound Redeemable Instruments. Orders can be removed from the pending order list at 754 and processing returns to 752 to search for additional matching orders. When no additional matches are present in the pending order list for the current Compound Redeemable Instrument, the "no" path from 752 is followed and processing loops to the next Compound Redeemable Instrument in the system.

When all matching orders in the system have been processed, logic extends to 756, whereupon the buy orders in the pending order lists for all Compound Redeemable Instruments in the system are together searched to determine whether to form an Instrument Set. An Instrument Set comprises the Compound Redeemable Instruments in a Redemption Instance 200. The sum of the buy orders in the Instrument Set is compared to the acquisition value of the Exchangeable Assets in the Asset Set at 757. If the sum of the buy orders in the Instrument Set exceeds the acquisition value of the Exchangeable Assets in the Asset Set, 757 branches to a processing routine, beginning at 758, for creating new Compound Redeemable Instruments then deletes these buy orders from the pending order list at 758.5, before returning to loop 756 to search for additional Instrument Sets. Alternatively, if the sum of the buy orders in the identified path does not exceed the total value of the path, the path identified in 756 is rejected at test 757 and different path combinations are searched.

The Instrument Set and the Asset Set described above for the creation of Compound Redeemable Instruments assumes equivalent specifications to the Instrument Set and Asset Set specified in the Redemption Instance 200. It is possible that alternative Instrument Set and Asset Set specifications be used for instruments issued and assets deposited compared to those for instruments redeemed and assets withdrawn in order to embed profit spreads or for other reasons.

If no additional Instrument Sets are located in subroutine 756, processing can continue, for example, with a subroutine beginning at 760, whereupon the sell orders in the pending order lists for all Compound Redeemable Instruments in the system are together searched to determine whether to form an Instrument Set. The sum of the sell orders in the Instrument Set is compared to the total disposition value of the Exchangeable Assets in the Asset Set at 761. If the sum of the sell orders in the Instrument Set is less than the disposition value of the Exchangeable Assets in the Redemption Instance 200, 761 branches to a processing routine, beginning at 762, for redeeming Compound Redeemable Instruments then deletes these sell orders from the pending order list at 762.5, before returning to loop 760 to search for additional Instrument Sets. Alternatively, if the sum of the sell orders in the identified path is not less than the total value of the path, the path identified in 760 is rejected at test 761 and different path combinations are searched. When all Instrument Sets are identified, the subroutine ends at 759. Alternatively, the subroutines of FIG. 7B may be performed in a different order, e.g., beginning at 751, 756, or 760 as separate or concurrent subroutines or both.

In some exemplary embodiments, the execution of buy and sell orders may be connected to procedures whereby trade is suspended in unusual market situations similar to circuit breakers of certain exchanges. The execution of buy and sell orders may be limited to certain classes of customers, such as dealers. The execution of the buy and sell orders may also be connected to a market surveillance system, such as those at existing at exchanges, to check for attempts at manipulation or other illegal or otherwise unacceptable trading practices.

Generally, three primary functions may be included in Compound Redemption Processor logic command instructions. Some embodiments of the three functions will be considered in FIGS. 10, 11 and 12 respectively.

Figure 10:
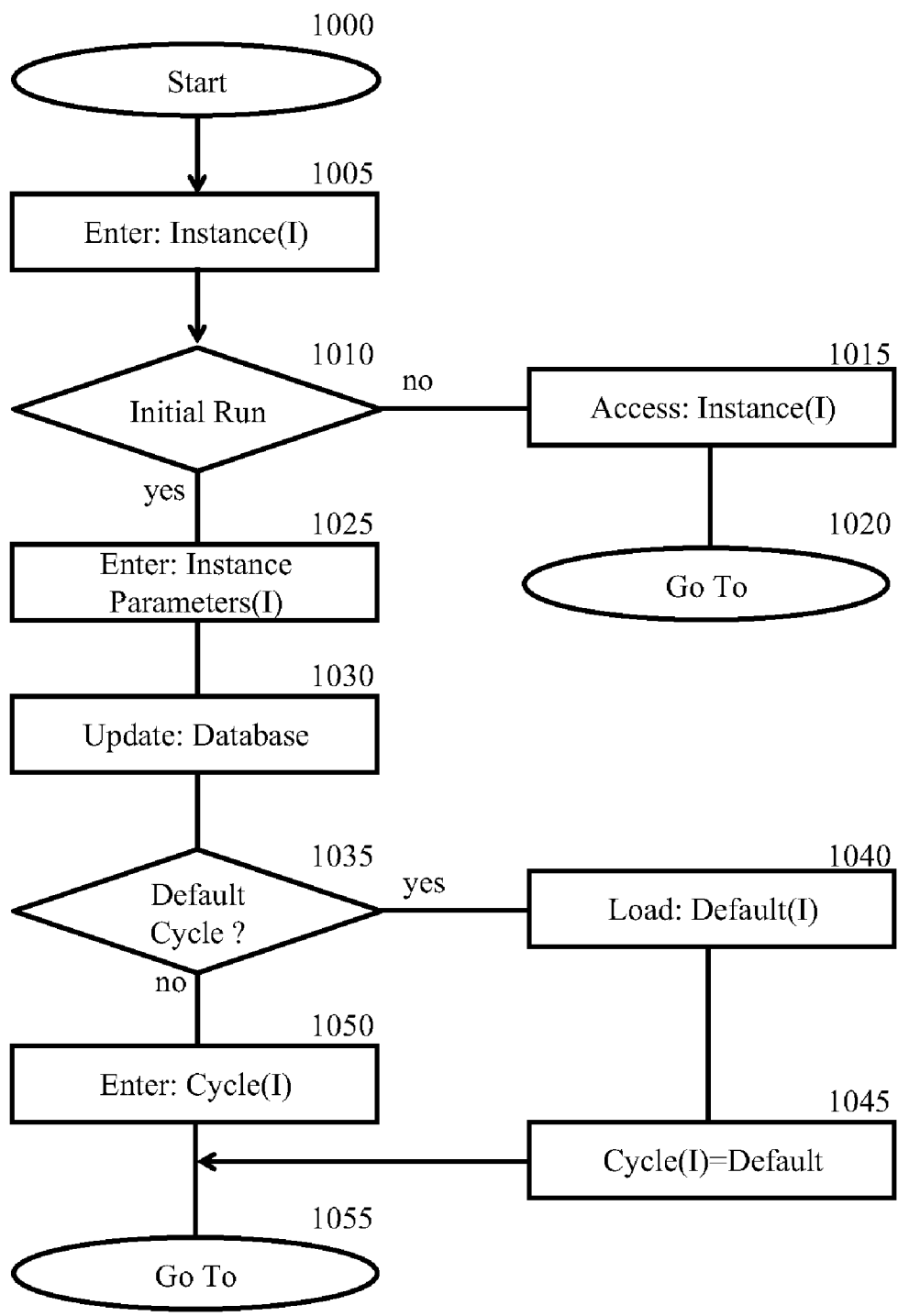
FIG. 10 illustrates exemplary steps related to an instance generator according to some embodiments of the present invention.

Referring now to FIG. 10, in some embodiments, a first function may allow controlled creation of the Redemption Instance by defining parameters of an Instrument Set comprising Compound Redeemable Instruments newly created from scratch or transformed from outstanding issuer instruments not Compound Redeemable Instruments redeeming for an Asset Set comprising specified Exchangeable Assets.

Figure 11:
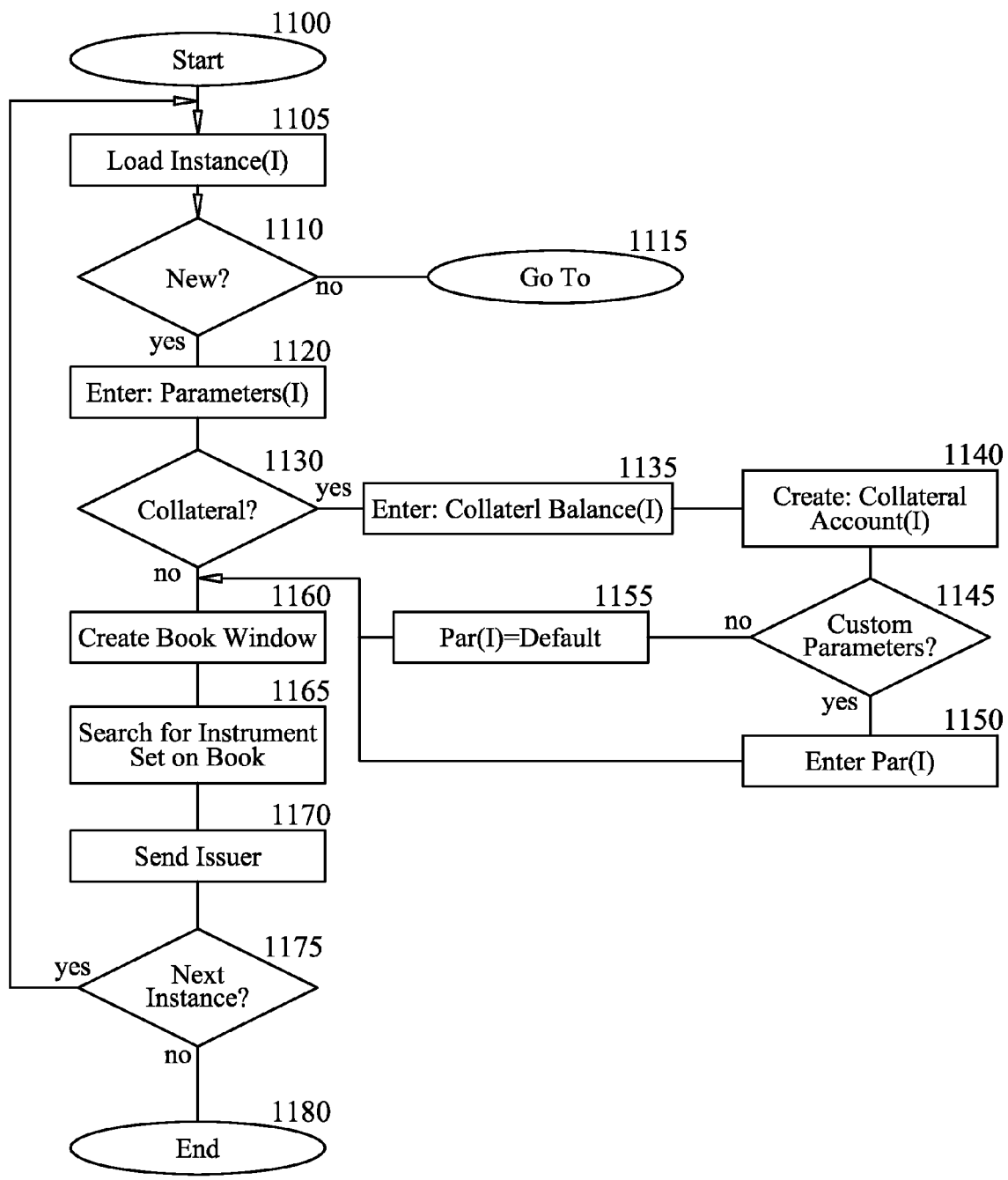
FIG. 11 illustrates exemplary steps related to a Processor Manager according to some embodiments of the present invention.

FIG. 11 considers a second function to formulate computer files and display forming the foundation for Redemption Instances.

Figure 12:
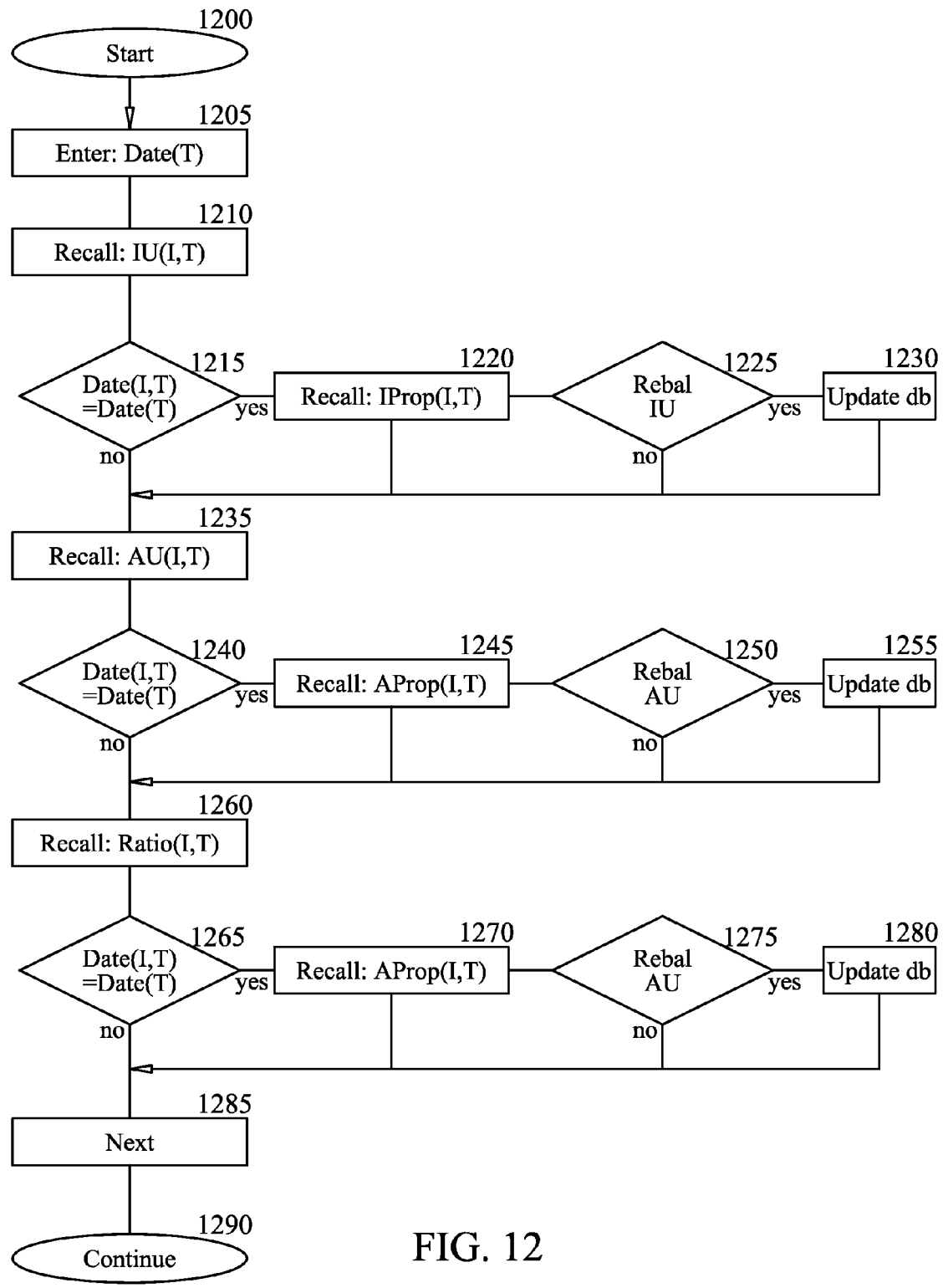
FIG. 12 illustrates a block diagram of logic that may be utilized by apparatus implementing some embodiments of the present invention.

FIG. 12 considers a third function can include management of Redemption Instances and issuance on a day-to-day basis. In each case, the critical controlling data must be stored in the properly configured database.

The first of these three functions is important, as success in offering requires identifying the appropriate risk categories and structural design for the Redemption Instance. Demand for Compound Redeemable Instruments and associated Exchangeable Assets may be changing all the time.

For example, in some embodiments, investor demand for Compound Redeemable Instruments linked to large capitalization exchange-listed equities may suddenly change to demand linked to small capitalization exchange-listed equities because of changes in market sentiment. In another example, investor demand for Compound Redeemable Instruments with a high ratio of Asset Sets owned by the issuer compared to Instrument Sets outstanding may be particularly important to investors in times of credit sensitivity, whereas in times of stable markets, an issuer's credit alone may be sufficient to back potential redemptions of Compound Redeemable Instruments. The system can be designed to allow the creation of new Compound Redeemable Instruments as automatically as possible by a trained representative of the system proprietor operating the Compound Redemption Processor or even possibly by broker clients themselves. If the cost of creating new Compound Redeemable Instruments is kept relatively low, then many more such Compound Redeemable Instruments should ultimately be created.

In some embodiments, the first function can be accomplished in accordance with an exemplary logic flow chart such as the one depicted in FIG. 10. Logic conceptually begins at a "start" position 1000 and continues to 1005 wherein an indicative Redemption Instance under consideration, Instance (I), is entered by the system user. Instance (I) may include relevant indicative terms of each of the two or more Compound Redeemable Instruments of different classes under consideration including their legal structures whether they be debt, equity, contract or otherwise, their maturity if applicable, their payoff structure, collateral backing, underlying reference indices or other return determinants. It may also include identification of the contemplated Exchangeable Assets for Redemption Instances and specify an indicative number and ratio of Compound Redeemable Instruments comprising the Instrument Set redeeming in exchange for the indicative number and ratio of Exchangeable Assets comprising the Asset Set.

The system may first test whether or not a Redemption Instance under consideration is new and cannot be approximated by either an existing Redemption Instance; a Redemption Instance already defined; a Redemption Instance with slightly different terms; or by groupings or combinations of thereof.

In an initial run 1010, a CRI system can search over existing Redemption Instances, the possibilities for new Redemption Instances with slightly different terms, or groupings or combinations thereof in order to display the characteristics of the Redemption Instances that may be thus generated.

In some embodiments, another Redemption Instance with slightly different terms may be close enough to that proposed. Some embodiments may therefore include a user that signals that an entered Redemption Instance is not sufficiently new, or if one of the possibilities put forward is satisfactory, logic branches to 1015 and existing records are pulled from a database for the already extant Redemption Instance including the instruments and assets or group thereof comprising the instance, with logic shifted to a separate subroutine 1020.

In some circumstances, such as, for example, in a corporate financing for an operating issuer, a Redemption Instance that is not otherwise considered sufficiently new still results in a positive response to test 1010.

A positive response to test 1010 branches logic to 1025 wherein the parameters of the Compound Redeemable Instruments and Exchangeable Assets, including the number and class of Compound Redeemable Instruments redeeming in exchange for Exchangeable Assets are specified. Requirements concerning the relative proportion of different classes of Compound Redeemable Instruments permitted to be outstanding can be specified and the instruments can be created. It is contemplated that in certain cases this limitation will correspond to coefficients of redemption for each specified class and in other cases it will not. The requirement for collateral, if any, in the form of Exchangeable Assets or otherwise to back instances of redemption is specified. The system continues to 1030 wherein the database is updated to include the specified information.

At 1035 a CRI system may query concerning a default cycle for reviewing the Redemption Instance for adjustment. A negative response to the query allows custom entry of a controlling cycle at 1050 setting the time interval between adjustments. A positive response defaults the controlling interval to a system-stored value, 1040 and 1045. This completes the first portion of the processing with logic shifted to the next sequence, 1055.

It is appreciated that a single issuer can provide for more than one type of Redemption Instance comprising different sets of instruments and assets and apply the above logic running in parallel or staggered to two or more different types of Redemption Instances involving similar or different Compound Redeemable Instruments, Exchangeable Assets, Instrument Sets and Asset Sets compared to other Redemption Instances.

Referring now to FIG. 11, formulation of the Redemption Instance and associated computer files and displays forming the foundation for the Redemption Instance in some embodiments is accomplished by the logic commands shown in FIG. 11. Beginning at 1100, a Process Manager may provide a server running executable software with logic that may first enable the entry of the pending Redemption Instance, Instance(I) 1105. This may include the Instrument Set and Asset Set comprising said Redemption Instance. The software may check whether an Instance is a new Instance at 1110. If it is not a new Instance, the system is directed to a separate subroutine 1115. If it is a new Instance, the logic continues to 1120 wherein the parameters specifying the Redemption Instance are entered. This may include an Instrument Set, coefficient v, Instrument Unit, coefficients $r_{1-x}$, and Compound Redeemable Instruments $R_{1-x}$. It may also include the Asset Set, coefficient u, Asset Unit, coefficients $e_{1-d}$, and Exchangeable Assets $E_{1-d}$.

At 1130 the logic queries whether collateral is required to back the issuer's redemption obligations under the Redemption Instance. If yes, the Collateral Balance required per Redemption Instance can be entered at 1135. The Collateral may take the form of any type of collateral in any amount specified by the system including Exchangeable Assets or other collateral in an amount less than, equal to or greater than that sufficient to satisfy the requirement of the Issuer to distribute Exchangeable Assets in a Redemption Instance. Implementation is made at 1140 wherein the collateral account is set up. This account may be held and managed by a third party or the issuer or some combination thereof. The account may be managed actively, passively or not at all. The system checks in 1145 whether custom account parameters are required. If yes, entry occurs in 1150, otherwise default values are entered in 1155.

As previously described, the system may include a communications link between various participants and governing institutions. A book window is created at 1160 for traders on the trading system, indicating the initial Instrument Set comprising Compound Redeemable Instruments redeeming in exchange for the initial Asset Set comprising Exchangeable Assets even though no instruments yet exist. As such, in some exemplary embodiments, customers may place orders that will appear on the book window. To create a first Instrument Set, a CRI trading system may first identify an Instrument Set whose offer value equals (or exceeds) the disposition value of the Asset Set unless the issuer is willing to risk potential arbitrage losses by allowing for the creation of Instruments costing less than their redemption value. Unless an issuer creates a first Instrument Set by transforming outstanding instruments that are not Compound Redeemable Instruments into Compound Redeemable Instruments, when an Instrument Set is first created the issuer must be notified with the transfer of funds or assets in payment of said Instrument Set. This is the case unless funds or assets are to be transferred to a repository other than the issuer such as a bank, or similar repository of capital, in which case creation of the Instrument Set is specified in advance. Thereafter, the system can fill orders both by exchanging existing Compound Redeemable Instruments and by finding Instrument Sets among orders 1165. During the routine operation of the system, the system proprietor will be directly responsible for calculating and updating the parameters comprising the Redemption Instance and administering the Collateral Account. The issuer is appraised in 1170.

Returning to FIG. 11 after the database is updated with current (and new) Redemption Instance specifications logic queries on the next Instance value (I+1) at 1175; if another batch is ready, logic continues to the beginning and the process is repeated for the next in series.

Referring now to FIG. 12, in some embodiments, day-to-day operation of a CRI system can include analysis of a variety of time-varying inputs and selective calculation of a number of distinct variables to allow operation of the process of Compound Redemption. A number and proportion of Compound Redeemable Instruments redeeming in exchange for a number and proportion of Exchangeable Assets is processed by the system in the Redemption Instance as previously illustrated in FIG. 2. In FIG. 12, several of the operations and routine procedures enabling the Redemption Instance are depicted as examples of system processing, recognizing that many other variables are tracked in like fashion and many other variations of the system are possible.

Beginning with 1200, logic in FIG. 12 first inputs the current date, date(T), and enters this into the process at 1205. The file for the current Instrument Unit is recalled and read in 1210. The event date for a change in any of the instruments comprising the Instrument Unit is compared to the present date to determine if the current date is an event date for adjusting the Instrument Unit. A positive response to test 1215 reflects the match of dates causing logic of the system to recall the proportion of Compound Redeemable Instruments $R_{1-x}$ according to coefficients $r_{1-x}$ comprising the current Instrument Unit FIG. 2 202 in 1220. A determination is made in 1225 as to whether the Instrument Unit requires rebalancing to reflect changes, if any, in its composition for reasons of operation of the instruments such as corporate actions, maturity events, or distributions affecting Compound Redeemable Instruments, legal or regulatory requirements or marketing reasons. For example, a 2:1 split in common equity Compound Redeemable Instruments may result in double the number of shares after the Instrument Unit adjustment. In the event that the determination calls for rebalancing, the database is updated in 1230 accordingly to reflect the new composition of the Instrument Unit.

Continuing, the system can recall and read the file for the current Asset Unit in 1235. The event date is compared to the present date to determine if the current date is an event date for adjusting the Asset Unit. A positive response to test 1240 reflects the match of dates causing logic of the system to recall the proportion of Exchangeable Assets $E_{1-d}$ according to coefficients $e_{1-d}$ comprising the current Asset Unit FIG. 2 205 in 1245. A determination is made in 1250 as to whether the Asset Unit requires rebalancing to reflect changes, if any, in its composition for reasons such as the loss or changes in Exchangeable Assets held or referenced, operation of financial assets such as corporate actions or others, legal or regulatory requirements or marketing reasons. For example, a loss of half an Exchangeable Asset held by the issuer due to theft may result in half the amount of such asset after the Asset Unit adjustment, assuming the issuer was able to pass through such loss. In another example, bonds may be received under a swap agreement and be included as an Exchangeable Asset in an Asset Unit after the Asset Unit adjustment. In the event that the determination calls for rebalancing, the database is updated in 1255 accordingly to reflect the new composition of the Asset Unit.

Continuing with the example, a CRI system may recall and read the file for the current Redemption Ratio in 1260. The event date is compared to the present date to determine if the current date is an event date for adjusting the Redemption Ratio. A positive response to test 1265 reflects the match of dates causing logic of the system to recall the multipliers v for example, as illustrated in FIG. 2 at 203 and u in FIG. 2 at 206 comprising the Redemption Ratio in 1270.

A determination may be made in 1275 as to whether the Redemption Ratio requires recalculation to reflect any changes in the coefficients determining the Redemption Ratio for reasons such as income and expenses assessed by the system. For example, income attributable to Exchangeable Assets held by an issuer might be used by the system to increase the number of Asset Units or decrease the number of Instrument Units in a Redemption Instance.

In another example, in some embodiments, expenses of an issuer can be calculated by a CRI system to increase a number of Instrument Units or decrease a number of Asset Units in a Redemption Instance. In the event that a determination calls for recalculation, the database can be updated in 1280 to reflect the new Redemption Ratio. The entire process can be repeated for the next Redemption Instance by incrementing Instance variable "I" in 1285.

Apparatus

Referring now to FIG. 8, exemplary apparatus with which the present invention may be implemented is presented in block form, generally highlighting the components of a computer system adapted and configured for implementing the innovative aspects discussed herein. In some embodiments, a computer system can include a central processor (CPU) 800 linked to a main database 801.

The main database includes archival data associated with the various instruments, customers and assets, and allows proper manipulation of the underlying parameters in accordance with system logic. The database structure is outlined in detail in the database structure section below. The logic controlling the system operation may be stored in discrete memory 802.

A user interface may be presented on the display 803. The user interface includes one or both of human readable graphics and text which represent data included in one or both of the main database 801 and the discrete memory.

One aspect of the foregoing system involves the input of information into the apparatus that may affect or determine the price of Compound Redeemable Instruments such as information concerning the terms, issuance, redemption and management of Compound Redeemable Instruments. Accordingly, the system apparatus includes at least one communication link 804 to a network for proper controlled communication to various institutions, investors or other participants involved in CRI instruments. Such participants utilize access devices 805 such as workstations located at remote locations, but in communication with the system. It is expected that the issuers, the depositor, the reference information provider(s), the brokers handling transactions with investors and the investors themselves, will each respectively communicate with a CRI system proprietor.

System apparatus can include digital electronic circuitry included within computer hardware, firmware, software, or in combinations thereof. Additionally, aspects of the invention can be implemented manually. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The present invention may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors.

Generally, a processor will receive instructions and data from a read-only memory and/or a random access memory. Generally, a computer will include one or more mass storage devices for storing data files; such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

In some embodiments, implementation of the features of the present invention is accomplished via digital computer utilizing uniquely defined controlling logic, wherein the computer system includes an integrated network between and among the various participants in Compound Redeemable Instruments.

The specific hardware configuration used is not particularly critical, as long as the processing power is adequate in terms of memory, information updating, order execution, redemption and issuance. Any number of commercially available database engines may allow for substantial account coverage and expansion. The controlling logic uses a language and compiler to match that on the CPU 800. These selections will be set according to per se well-known conventions in the software community.

Referring now to FIG. 9, additional aspects of computer hardware useful for implementing the present invention are illustrated as a block diagram that includes a computer system 950 upon which an embodiment of the invention may be implemented. Computer system 950 includes a bus 952 or other communication mechanism for communicating information, and a processor 954 coupled with bus 952 for processing information. Computer system 950 also includes a main memory 956, such as a random access memory (RAM) or other dynamic storage device, coupled to bus 952 for storing information and instructions to be executed by processor 954. Main memory 956 may also be used for storing temporary variables or other intermediate information during execution of instructions to be executed by processor 954. Computer system 950 further includes a read only memory (ROM) 958 or other static storage device 960, such as a magnetic disk or optical disk, may be provided and coupled to bus 952 for storing information and instructions.

Computer system 950 may be coupled via bus 952 to a display 962, such as a cathode ray tube (CRT) or liquid crystal display (LCD), for displaying information to a computer user. An input device 964, including alphanumeric and other keys, may be coupled to bus 952 for communicating information and command selections to processor 954. Another type of user input device is cursor control 966, such as a mouse, a trackball, a touchpad, or cursor direction keys for communicating direction information and command selections to processor 954 and for controlling cursor movement on display 962. This input device typically has two degrees of freedom in two axes, a first axis (e.g., x) and a second axis (e.g., y), that allows the device to specify positions in a plane.

The invention is related to the use of computer system 950 for Compound Redeemable Instruments. According to one embodiment of the invention, Compound Redeemable Instruments are defined and managed by computer system 950 in response to processor 954 executing one or more sequences of one or more instructions contained in main memory 956. Such instructions may be read into main memory 956 from another computer-readable medium, such as storage device 960. Execution of the sequences of instructions contained in main memory 956 causes processor 954 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 954 for execution. Such a medium may take many forms, including but not limited to, non-volatile media, volatile media, and transmission media. Non-volatile media includes, for example, optical or magnetic disks, such as storage device 960. Volatile media includes dynamic memory, such as main memory 956. Transmission media includes coaxial cables, copper wire and fiber optics, including the wires that comprise bus 952. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 954 for execution. For example, the instructions may initially be carried on a magnetic disk of a remote computer. The remote computer can load the instructions into its dynamic memory and send the instructions over a telephone line using a modem. A modem local to computer system 950 can receive the data on the telephone line and use an infrared transmitter to convert the data to an infrared signal. An infrared detector can receive the data carried in the infrared signal and appropriate circuitry can place the data on bus 952. Bus 952 carries the data to main memory 956, from which processor 954 retrieves and executes the instructions. The instructions received by main memory 956 may optionally be stored on storage device 960 either before or after execution by processor 954.

Computer system 950 also includes a communication interface 969 coupled to bus 952. Communication interface 969 provides a two-way data communication coupling to a network link 970 that may be connected to a local network 972. For example, communication interface 969 may be an integrated services digital network (ISDN) card or a modem a data communication connection to a corresponding type of telephone line. As another example, communication interface 969 may be a local area network (LAN) card a data communication connection to a compatible LAN. Wireless links may also be implemented. In any such implementation, communication interface 969 sends and receives electrical, electromagnetic or optical signals that carry digital data streams representing various types of information.

Network link 970 typically provides data communication through one or more networks to other data devices. For example, network link 970 provides a connection through local network 972 to a host computer 974 or to data equipment operated by an Internet Service Provider (ISP) 976. ISP 976 in turn provides data communication services through the worldwide packet data communication network now commonly referred to as the "Internet" 979. Local network 972 and Internet 979 both use electrical, electromagnetic or optical signals that carry digital data streams. The signals through the various networks and the signals on the network link 970 and through communication interface 969, which carry the digital data to and from computer system 950 are exemplary forms of carrier waves transporting the information.

Computer system 950 can send messages and receive data, including program code, through the network(s), network link 970 and communication interface 969. In the Internet example, a server 990 might transmit a requested code for an application program through Internet 979, ISP 976, local network 972 and communication interface 969. In accordance with the invention, one such downloaded application provides for values of Exchangeable Assets upon redemption of Compound Redeemable Instruments as described herein.

Processor 954 may execute the received code as it is received, and/or stored in storage device 960, or other nonvolatile storage for later execution. In this manner, computer system 950 may obtain application code in the form of a carrier wave.

An alternative configuration involves, instead of access device 805 as a workstation linked by windows, an Internet web site allowing trade directly over the Internet. Use of the system may still be restricted to brokers, if that were to be the objective, by suitable password procedures.

Access devices 805 may therefore include any device capable of interacting with computer system 950 or other service provider. Some exemplary devices may include, a personal digital assistant, a mobile phone, a netbook, a notebook computer, a laptop computer, a terminal, a kiosk or other type of automated apparatus.

EXAMPLES

It will be apparent to one skilled in the art that numerous embodiments of Compound Redeemable Instruments and Exchangeable Assets are possible. Included herein are some examples of various embodiments illustrating different aspects of the present invention including: derivative on illiquid underlying including arbitrage; synthetic short stock position; collateralized bond obligation; securitized prime brokerage, and operating issuer.

Referring now to FIG. 13, a spreadsheet illustrates some exemplary events and calculations of an Instrument Set 1303 and Asset Set 1304 resulting from associated changes in one or more coefficients and multipliers determining them as they relate to Sequential Events 1305. The Instrument Set 1303 includes one or more Instruments 1301 and the Asset Set 1304 includes one or more Assets 1302. Examples may include calculations for relative and absolute numbers of Compound Redeemable Instruments and Exchangeable Assets comprising the instances of Compound Redemption which can be implemented in the form of method steps on automated apparatus, such as a Compound Redemption Processor. It is appreciated that in various embodiments certain events may be treated in a variety of different ways. For example, the payment of expenses or the attribution of income may be embedded in the terms of a Compound Redeemable Instrument such as a warrant referencing an index that is adjusted for such expenses paid or income attributed.

Figure 14:
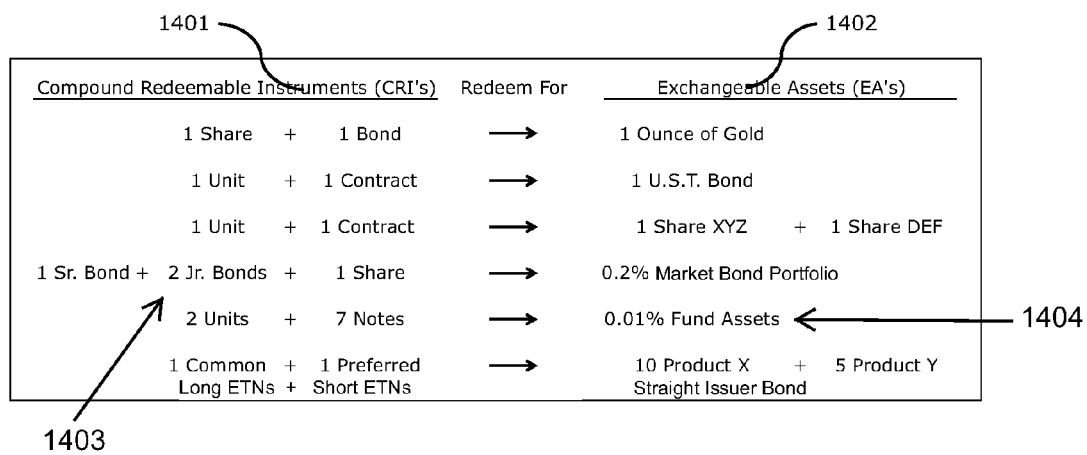
FIG. 14 illustrates a table with examples of Compound Redeemable Instruments and corresponding Exchangeable Assets.

Referring now to FIG. 14, a table 1400 includes a list of exemplary Compound Redeemable Instruments 1401 and a corresponding exemplary Exchangeable Assets 1402. It is pointed out that the table 1400 illustrates how Financial Instruments 1403 included in the CRI portion of the table 1401 and additional Financial Instruments 1404 and assets making up the correlating EA 1402 are from different classes in each example. It is also pointed out that in each case the CRIs 1401 include Financial Instruments 1404 of more than one class. More specifically, the examples include: a CRI equity share and a CRI bond which correlate with an EA of an ounce of gold; a CRI unit and a CRI contract with an EA of a U.S. Treasury Bond; a CRI unit and a CRI contract with an EA of an equity share in a first corporation ABC and an EA of an equity share in a second corporation DEF; a CRI senior bond, two CRI junior bonds and a CRI share with correlating EAs comprising 0.2% of a market bond portfolio; two CRI units and seven CRI notes with correlating EAs comprising 0.1% of fund assets; one CRI common share and one CRI preferred share with correlating EAs of ten EA Product X's and five EA Product Y's; one Issuer A long index-linked ETN and one Issuer A short index-linked ETN redeeming for one Issuer A straight coupon bond. Numerous other Compound Redeemable Instruments and correlating Exchangeable Assets are also within the scope of the present invention.

Figure 15:
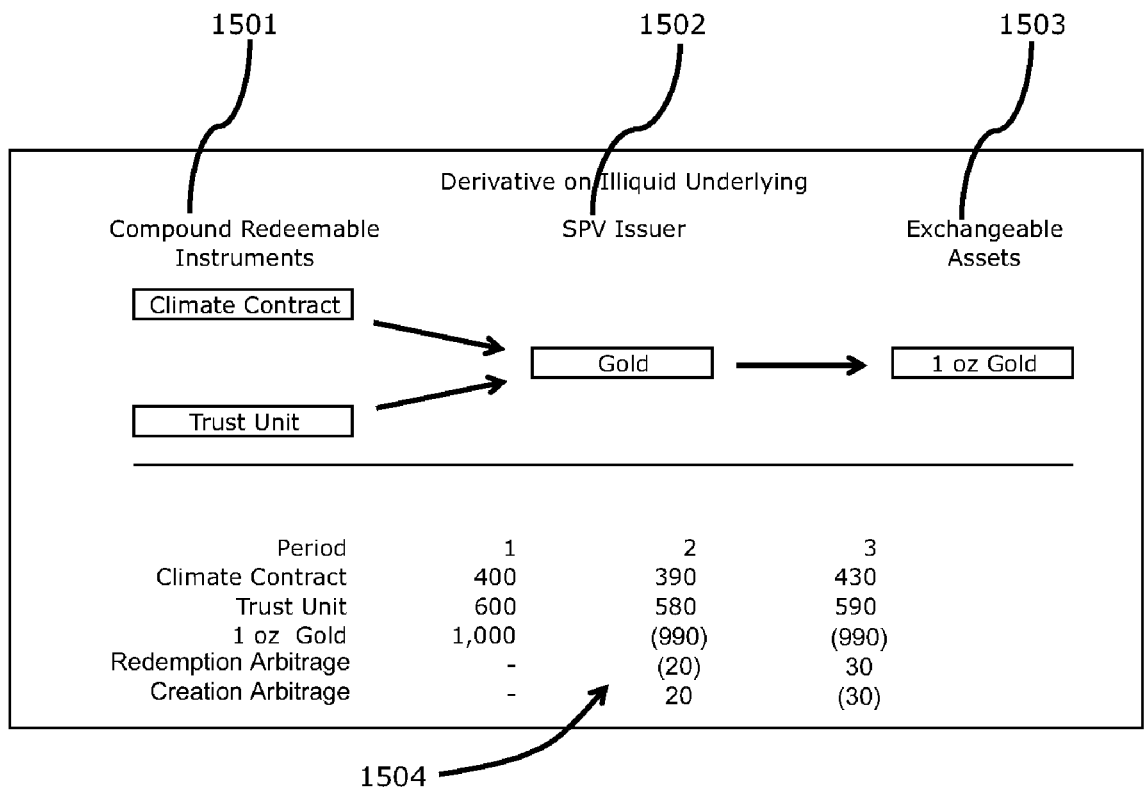
FIG. 15 illustrates an example of a derivative with an illiquid underlying.

Referring now to FIG. 15, in the case of a derivative on illiquid underlying, at 1501 CRIs include instruments of two or more different classes, such as, for example, one or more derivative contracts referencing climate and one or more trust units. A Special Purpose Vehicle (sometimes referred to as a "SPV") issuer 1502 may issue the CRIs with a guarantee of redemption for EA 1503, such as, as shown, one ounce of gold. At 1504, a table is included which illustrates a relative value of the CRIs and the EA at three different time periods. As illustrated, the arbitrage amount may be negative or positive during different periods. For simplicity, a bid-offer spread is not incorporated in the illustration.

Figure 16:
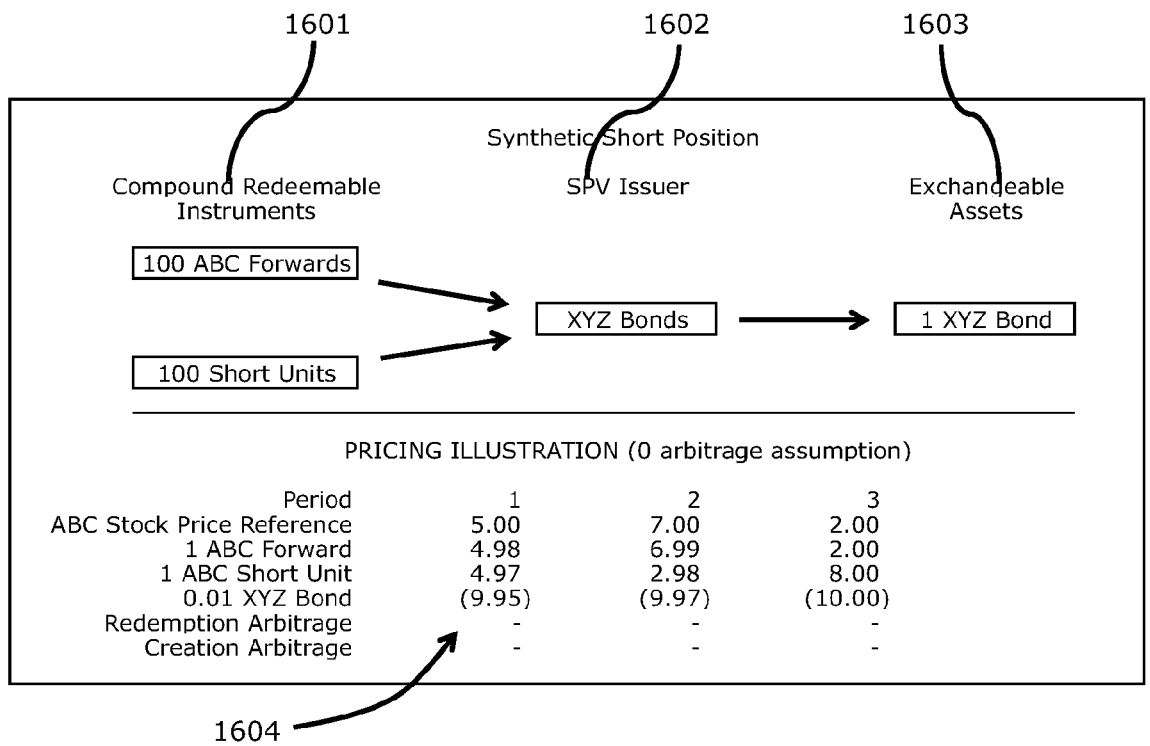
FIG. 16 illustrates an example of a short stock position.

Referring now to FIG. 16, an example of CRIs including a synthetic short stock position. In this example, CRIs include one hundred CRI ABC forwards issued by the issuer and one hundred CRI short units being equity units of the issuer with EAs being XYZ bonds. Once again, it is pointed out that the Financial Instruments comprising the CRIs that are ABC forwards and the CRIs that are short units are of disparate classes. It is also pointed out that the Financial Instruments included in the EAs being bonds of issuer XYZ are of disparate classes than the CRIs. It is noted that at least two CRIs in an instance of Compound Redemption will be of different classes from each other. At 1604 a table of exemplary pricing is included with zero arbitrage. For simplicity, a bid-offer spread is not incorporated in the illustration.

Figure 17:
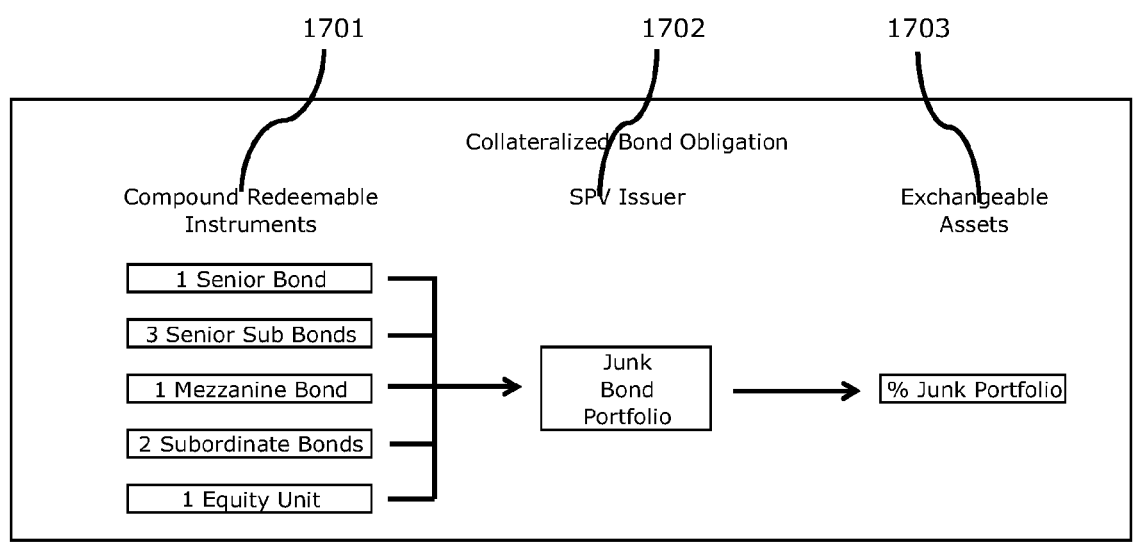
FIG. 17 illustrates an example of a collateralized bond obligation.

Referring now to FIG. 17, an example that includes a collateralized bond obligation is illustrated. In this example, CRIs 1701 includes multiple bond type Financial Instruments, including: a senior bond, three senior sub bonds, a mezzanine bond, two subordinate bonds ad one equity unit. An SPV issuer 1702 of the CRIs may offer correlating EAs 1703 which include specified junk bonds which may be described as a fraction of a referenced junk bond portfolio that may be held by a third party or the SPV or not held.

Figure 18:
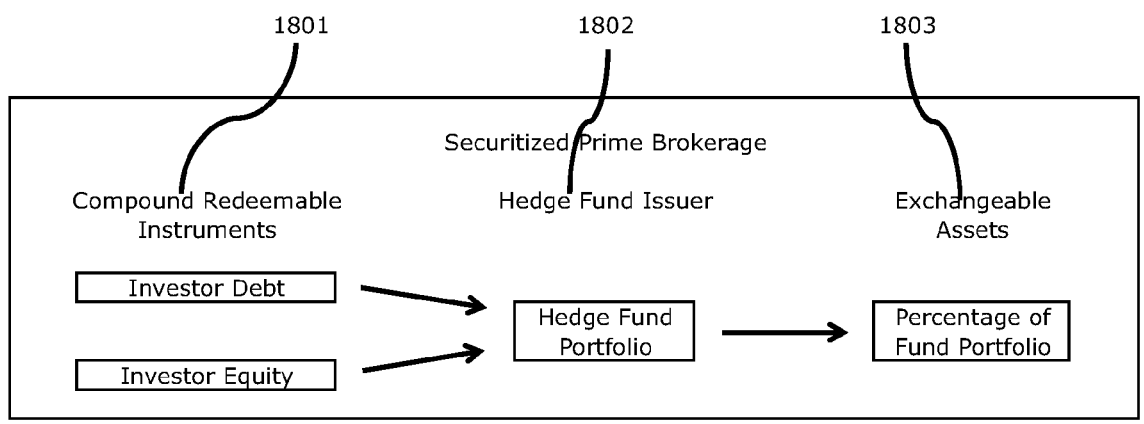
FIG. 18 illustrates an example of a securitized prime brokerage.

FIG. 18 illustrates another example, this one directed towards a securitized prime brokerage scenario. As illustrated, CRIs 1801 may include investor debt and investor equity of a hedge fund issuer 1802 providing for correlating EAs 1803 which include a percentage of its hedge fund portfolio.

Figure 19:
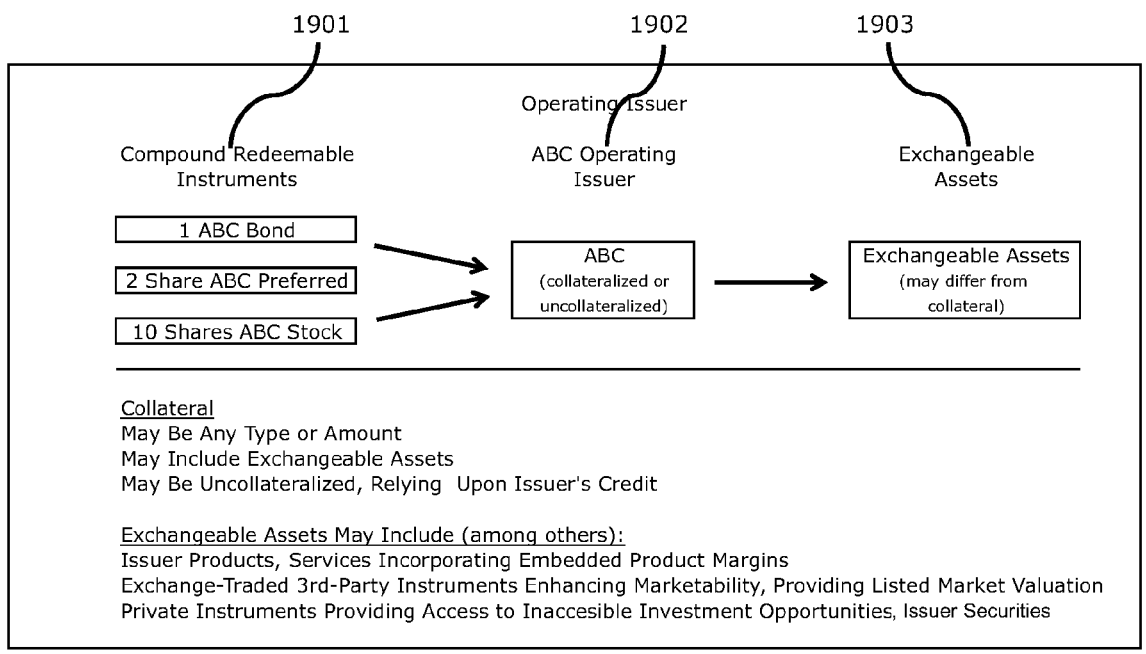
FIG. 19 illustrates an example of an operating issuer.

Referring now to FIG. 19, still another example illustrates an operating issuer 1902 with CRIs 1901 that include a bond, described therein as an ABC bond, two shares of ABC preferred stock and ten shares of ABC common stock. The operating issuer 1902 may provide EAs which include one or more of collateralized and uncollateralized assets of ABC which may include its own securities, products and services, among others.

In another aspect of the present invention, the following data fields may be included by way of an exemplary arrangement of fields that may be included in a database useful for implementing some aspects of the present invention. The database, may, for example, have data populated and extracted via executable code running on a Compound Redeemable Instruments data processor.

Exemplary Database Structure
Format:
Records
Fields
Instrument Holder Information
    Customer I.D. Number:
    Name or firm:
    Address:
    Instrument ID Numbers*:
    Current Numbers of Instruments Owned per ID Number*:
    Transaction ID Numbers*:
Transaction Information
    Transaction ID Number:
    Instrument ID Number:
    Buyer ID Number:
    Seller ID Number:
    Trade, Transformation, Issuance, Redemption:
    Date and Time of Transaction:
    Number of Instruments:
    Price (Trade):
    Instrument Unit ID Number:
    Instrument Set ID Number:
Buy and Sell Orders
    Order Number:
    Customer ID Number:
    Buy Order or Sell Order:
    Instrument ID Number:
    If Market Order: Number Instruments
    If Limit Order: Price and Number of Instruments
    If Stop Order: Price and Number of Instruments
    Order Date and Time*:
    Order Expiration Date and Time:
Issuance
    Issuance ID Number:
    Instrument ID Number:
    Customer ID Numbers*:
    Number Issued*:
    Date and Time*:
Transformation
    Transformation ID Number:
    Instrument ID Number:
    Customer ID Numbers*:
    Number Transformed*:
    Date and Time*:
Redemption Instance
    Instance ID Number:
    Instrument Set ID Number:
    Asset Set ID Number:
    Customer ID Numbers*:
    Number Instrument Sets Redeemed*:
    Date and Time*:
Instrument Set
    Instrument Set ID Number:
    Instrument Set Multiplier (v):
    Instrument Unit ID Number:
    Update Frequency:
    Previous Update Date:

Next Update Date:
Number Outstanding:
Instrument Unit
    Instrument Unit ID Number:
    Instruments ID Numbers*:
    Instruments Coefficients $(r_1, \ldots, r_x)$*:
    Update Frequency:
    Previous Update Date:
    Next Update Date:
Instrument
    Instrument ID Number:
    Instrument Class: Equity A, Equity B, Bond, Contract, etc.
    Instrument Terms:
    Update Frequency:
    Previous Update Date:
    Next Update Date:
    Market Price:
    Number Outstanding:
Asset Set
    Asset Set ID Number:
    Asset Set Multiplier (u):
    Asset Unit ID Number:
    Update Frequency:
    Previous Update Date:
    Next Update Date:
    Number Owned By Issuer:
Asset Unit
    Asset Unit ID Number:
    Asset(s) ID Number(s)*:
    Asset(s) Coefficient(s) $(e1, \ldots, ed)$*:
    Update Frequency:
    Previous Update Date:
    Next Update Date:
Asset
    Asset ID Number:
    Asset Type: Share, Commodity Unit, Item, etc.
    Asset Terms:
    Update Frequency:
    Previous Update Date:
    Next Update Date:
    Market Price:
    Number Owned By Issuer:
Historical Instance Changes:
    Historical Instance Change ID Number:
    Historical Instance Change Date*:
    Historical Instance Instruments Before Change*:
    Historical Instance Instruments After Change*:
    Historical Instance Assets Before Change*:
    Historical Instance Assets After Change*:
Instrument Creation History
    Instrument ID Number:
    Issuance or Transformation ID Number:
    Creation Date*:
    Numbers of Instruments*:
    Consideration*:
Instrument Redemption History
    Instrument ID Number:
    Instance ID Number:
    Redemption Date*:
    Numbers of Instruments*:
    Consideration*:
Coverage Information
    Instrument Excesses $(R_x/(vr_x \text{ Instrument Sets}))$*:
    Asset Underages $(E_d/(ue_d \text{ Asset Sets}))$*
    Asset Sets Owned: Instrument Sets Issued Ratio:
* may be a multiple field In another aspect of the present invention, the following functions of a Compound Redemption Processor are included herein by way of an exemplary arrangement of functions that may be ordered by participants for implementing various aspects of the present invention. The functions, may, for example, be ordered by a system proprietor, brokers or investors and may link to data populated and extracted via executable code running on a Compound Redemption Processor.

Exemplary Functions of Compound Redemption Processor
1. Functions Ordered by System Proprietor
    Add Instrument Data
        Load new Compound Redeemable Instruments into a Record Database
        Fill in other Fields of an Instrument Record
    Update Instrument Terms (run daily)
    For Each Instrument:
        Is Terms Update Due Today?
        If Yes:
            Update Instrument Terms
            Fill in Next Update Date
    Update Number Outstanding (run daily)
    Add Instrument Unit Data
        Load New Instrument Unit into Record Database
        Fill in other Fields of Instrument Unit
    Update $r_x$ Coefficients (run daily)
    Add Instrument Set Data
        Load New Instrument Set into Record Database
        Fill in other Fields of Instrument Set into Record Database
    Update v Multiplier (run daily)
    Update Number Outstanding (run daily)
    Add Exchangeable Asset Data
        Load new Exchangeable Assets into Record Database
        Fill in other Fields of Exchangeable Assets into Record Database
    Update Exchangeable Asset Terms (run daily)
    For Each Exchangeable Asset:
        Is Terms Update Due Today?
        If Yes:
            Update Exchangeable Asset Terms
            Fill in Next Update Date
    Update Number Owned By Issuer (run daily)
    Add Asset Unit Data
        Load New Asset Unit into Record Database
        Fill in other Fields of Asset Unit
    Update $e_d$ Coefficients (run daily)
    Add Asset Set Data
        Load New Asset Set into Record Database
        Fill in other Fields of Asset Set into Record Database
    Update u Multiplier (run daily)
    Update Number Owned By Issuer (run daily)
    Add Redemption Instance Data
        Load New Instance into Record Database
        Fill in other Fields of Instance
    Update Number of Redemption Instances (run daily)
2. Functions Ordered by Brokers
    Process, Buy Or Sell (run when order comes in)
        Receive Transaction Request and Enter into Database
        Display Order on Screen with Other Unfilled Orders
        Display Historical Instrument Prices
        Display Historical Asset Prices
        Calculate and Display Historical Instrument Set Prices
        Calculate and Display Historical Asset Set Prices
        Search for Current Buy and Sell Orders of Same Instrument
        Identify Matches in Limit Orders and Numbers of Instruments
            If found Execute Orders Exchanging Existing Instruments If None Found Combine with same type Orders (e.g. buys for same Instrument)
If a Bid for an Instrument
  Search for Instrument Set Among Bids
  If Total Bid Prices in Instrument Set>=Price of Asset Set Then:
  Issue Instrument Set
  Create or Update Instrument Holder Records
  Create Transaction Record
  Create Issuance Record
  Update Instrument Record
  Update Instrument Set Record
  Deposit Asset Set if Required or if Hedging
  Update Asset Record
  Update Asset Set Record
  Update Issuance Record
  Update Instrument Creation History
If an Offer to Sell an Instrument
  Search for Instrument Set Among Offers
  If Total Offer Prices in Instrument Set<=Price of Asset Set Then:
  Redeem Instrument Set
  Update Instrument Holder Record
  Create Transaction Record
  Create Redemption Record
  Update Instrument Record
  Update Instrument Set Record
  Withdraw Asset Set if Required or if Hedging
  Update Asset Record
  Update Asset Set Record
  Update Instrument Redemption History
Provide for Electronic Trading System
  Order Processing and Confirmation
  Provide Information for Book Window for Trading Screen 3. Functions Ordered by Investors (Informational Web Site):
View Outstanding Limit Orders (Book Window)
View Compound Redeemable Instruments
  Instrument Class
  Instrument Terms
  Number Outstanding
View Exchangeable Assets
  Asset Type
  Asset Terms
  Number Outstanding
View Redemption Instance
  Instrument Unit Coefficients
  Instrument Set Multiplier
  Asset Unit Coefficients
  Asset Unit Multiplier
View Historical Instance Changes
View Instrument Excess
View Asset Ratio Following now is a discussion including more detail relating to examples which exemplify some embodiments of the present invention. The discussion is meant to be illustrative and not limiting in character.

In some embodiments, an Issuer may be a legal entity such as a trust issuing two classes of Compound Redeemable Instruments in a private placement exempt from registration under the 1933 Act. The Compound Redeemable Instruments may be resold in accordance with Rule 144A. Generally, Rule 144A permits the resale of certain unregistered securities to Qualified Institutional Buyers without requiring registration under the 1933 Act. The CRIs are traded on the NASDAQ PORTAL Alliance system or other similar private services enabling a certain amount of liquidity among institutional buyers without listing on a national exchange or registering under the Securities Exchange Act of 1934, and rely on Section 3(c)(7) of the Investment Company Act of 1940 which provides an exemption from its provisions for Qualified Purchasers.

One class may comprise derivative contracts of a single type and another class may comprise units of trust equity of a single type. In exchange for issuing the contracts and the units, the trust deposits Exchangeable Assets comprising bonds of an unaffiliated issuer. The instruments redeem as an Instrument Set. Each Instrument Set including ten Instrument Units each Instrument Unit including one contract and one unit of trust equity redeeming in exchange for assets exchanging as an Asset Set each including one Asset Unit comprising one bond or the cash equivalent thereof.

Conversely, instruments issue as an Instrument Set each comprising ten Instrument Units each comprising one said contract and one said unit issuing in exchange for the deposit of assets as Asset Sets each comprising one Asset Unit each comprising one said bond or the cash equivalent thereof. Redemptions and issuances take place through a Depositor charging a fee. Said contracts and units own and trade separately until redeemed or maturing in the case of said contract. Redeeming instruments may retain, extinguished or reissued by the Issuer.

Contracts may include terms selected from a broad universe of terms including virtually any payoff formulation and underlying reference either singly or in combination including those that may or may not be possible to buy, hold, sell or otherwise invest in either directly or indirectly. Examples of such payoff formulations include any linear, exponential, digital or other mathematical formulation. Examples of such underlying references may include any flow, claim, return, price, level, outcome, statistical result, event or other measurable effect. Units represent a residual value in the trust issuer after all expenses of the trust and the payments due under the terms of the contract.

As a result, amounts payable under said unit and said contract may vary inversely to each other and may be limited in aggregate by the value of the bonds. In the event that the terms of the contract are not self-limiting, its payout may equal or exceed the corresponding value of said bonds such that the value of the said units would be driven to zero.

In some embodiments, the present invention provides benefits of a derivative contract with additional liquidity and transparency and without the counter-party risk, hedging limitations, and costs associated with traditional dealer offerings, among others. This distinguishes over other products which do not offer the ability to redeem a plurality of different classes of interests to accomplish such benefits.

In furtherance of the preceding specific exemplary embodiment, the terms of the contract provide for payment of an amount on the maturity date of the contract two years hence equal to the price one week prior to the maturity date of a single share of stock listed on a nationally recognized stock exchange. As the price of the stock increases the contract becomes more valuable reflecting its likely increased payoff amount on the maturity date. Because the trust owns bonds that pay a fixed amount, the anticipated residual value available to units reduces as the payoff on the contract increases. As a result, the equity unit resembles a short position in the stock increasing in value as the stock declines and decreasing in value as the stock increases. Unlike an actual short position in the stock, the holder of the unit cannot lose more than the cost of the unit. Compared to traditional means for shorting stock, the system provides a more efficient less cumbersome alternative eliminating the need to locate, borrow and sell shares thereby eliminating the costs, inefficiencies and risks associated with locating stock, borrowing stock, losing the ability to borrow stock, selling shares, repurchasing shares, paying stock lending intermediaries, stock borrow fees and fees associated with posting and managing collateral, among others. In addition, compared to selling single stock futures the unit is appealing as a cash instrument with a limited downside unlike a single stock futures position where the potential loss is unlimited.

In furtherance of the preceding specific exemplary embodiment, the contract may be based on climate measurements or the performance of a sports team.

In another specific exemplary embodiment, a newly formed issuer is a corporation issuing four classes of Compound Redeemable Instruments in a private placement exempt from registration under the 1933 Act. The Compound Redeemable Instruments may be resold in accordance with Rule 144A permitting the resale of certain unregistered securities to qualified institutional buyers without requiring registration under the 1933 Act, are traded on the NASDAQ PORTAL Alliance system enabling a certain amount of liquidity among institutional buyers without listing on a national exchange or registering under the Securities Exchange Act of 1934, and rely on Section 3(c)(7) of the Investment Company Act of 1940 which provides an exemption from its provisions for Qualified Purchasers. Three classes comprise bonds with terms separate and distinct from each other class and another class comprises equity shares of the issuer. In exchange for issuing the bonds and the shares the corporation deposits Exchangeable Assets comprising a pool of notes backed by similar residential real estate mortgages on units in a condominium development.

The instruments may redeem as an Instrument Set each comprising 2 Instrument Units each comprising four hundred of the bonds of one class, three hundred of the bonds of another class, two hundred of the bonds of another class and one hundred of the shares in exchange for assets exchanging as an Asset Set each comprising 1 Asset Unit comprising two said mortgages. Conversely, instruments issue as an Instrument Set each comprising 2 Instrument Units each comprising four hundred of the bonds of one class, three hundred of the bonds of another class, two hundred of the bonds of another class and one hundred of the shares issuing in exchange for the deposit of assets as an Asset Set each comprising one Asset Unit each comprising two said mortgages.

Redemption and issuance takes place directly with an issuer charging a fee. The bonds and the shares own and trade separately until redeemed or maturing in the case of said bonds. Redeeming instruments may be retained, extinguished or reissued by the Issuer. The bonds of each class of bonds comprise terms selected from a broad universe of terms including virtually any combination of interest payments, interest payment dates, maturity dates, seniority, and others, one or more of which are different compared to bonds of each other class. The share represents the residual value in the company after all expenses of the company and the payments due under the terms of the bonds. The bonds provide security of terms in their seniority to each other and to the shares. The shares benefit from unlimited upside leveraged by the bonds. The system provides the benefits of more efficient leverage resulting from increased liquidity and transparency of Compound Redeemable Instruments compared to other instruments not Compound Redeemable Instruments.

In furtherance of the preceding exemplary embodiment, the issuer is an existing corporation with additional outstanding instruments that are not Compound Redeemable Instruments.

In another specific exemplary embodiment, the capital structure of an existing publicly registered corporate issuer comprises one class of publicly listed thinly traded shares and one class of illiquid bonds neither being Compound Redeemable Instruments. Subsequently, said issuer converts said classes including all outstanding and future issues of each into Compound Redeemable Instruments redeeming in exchange for Exchangeable Assets comprising readily marketable widgets of said issuer's manufacture. Said Compound Redeemable Instruments redeem as an Instrument Set each comprising 3 Instrument Units each comprising 11 shares and 1 bond exchanging for an Asset Set each comprising one Asset Unit each comprising 1000 Exchangeable Assets each Exchangeable Asset representing one said widget.

The system provides liquidity and transparency to the issuer's securities by enabling a market to place an objective value on an Instrument Set enabling arbitrageurs to create and redeem shares and bonds jointly against said value.

The system thereby stimulates market interest in the issuer's securities enabling the issuer to raise capital more efficiently. The system enables the issuer to "buy back" its securities at a discount as a result of the profit margin that it builds into the widgets in accordance with its normal operations. The system enables the use of widgets to redeem its instruments thereby reducing inventory, increasing the volume of widget production and improving profit margins. The system accomplishes this without requiring the issuer to place a relative value on its shares compared to its bonds. As discussed broadly above, aspects of the present invention may therefore include the following specific attributes, such as, apparatus and methods to redeem jointly Compound Redeemable Instruments belonging to different classes in exchange for one or more classes of equitably divisible assets, including cash or the cash value of such assets, referred to herein as Exchangeable Assets, on an ongoing basis.

In another aspect of the present invention an integrated financial system and method referred to herein as the Compound Redemption Processor to create, redeem, distribute, manage and support Compound Redeemable Instruments on an ongoing basis is provided.

In another aspect of the present invention a method to facilitate transactions between buyers and sellers of Compound Redeemable Instruments is provided.

In still another aspect of the present invention a method for reporting upon Compound Redeemable Instruments is provided.

In another aspect of the present invention Compound Redeemable Instruments with enhanced trading characteristics associated with the liquidity and transparency of redeemable financial instruments is provided.

In another aspect of the present invention opportunities for investment, trading, speculation, hedging and arbitrage based on the interplay in price relationships among Compound Redeemable Instruments and Exchangeable Assets is provided.

In another aspect of the present invention improved derivative instruments in the form of Compound Redeemable Instruments with more flexible payout formulations, less counterparty risk, less market impact, better liquidity, greater transparency and improved pricing efficiency compared to other derivative instruments is provided.

In another aspect of the present invention improved structured finance instruments in the form of Compound Redeemable Instruments with increased liquidity, transparency, and pricing efficiency compared to other structured finance instruments is provided.

In another aspect of the present invention improved securitizations in the form of Compound Redeemable Instruments with increased liquidity, transparency, and pricing efficiency compared to other securitizations is provided.

In another aspect of the present invention to enable issuers to transform their securities that are not Compound Redeemable Instruments into Compound Redeemable Instruments providing improved transparency and liquidity is provided.

In another aspect of the present invention to enable operating companies such as manufacturers to increase operating efficiency by issuing or transforming outstanding securities into Compound Redeemable Instruments redeeming for Exchangeable Assets comprising assets relating to the issuer's operations such as inventory, operating or finished goods assets is provided.

In another aspect of the present invention a data processing system to enable the distribution and trading of Compound Redeemable Instruments is provided.

In another aspect of the present invention a data processing system to convey information about Exchangeable Asset values and prices in essentially real time is provided.

In some exemplary embodiments of the present invention, Instrument Units each comprising Compound Redeemable Instruments of more than one class redeem for Asset Units each comprising Exchangeable Assets of at least one class on an ongoing basis according to a Redemption Ratio number determined by the system.

In other exemplary embodiments, Coefficient v number of Instrument Units comprise an Instrument Set and Coefficient u number of Asset Units comprise an Asset Set where v/u is the Redemption Ratio defining the fewest number of Compound Redeemable Instruments redeeming in exchange for Exchangeable Assets.

In other exemplary embodiments, the Redemption Ratio defines other than the fewest number of Compound Redeemable Instruments redeeming in exchange for Exchangeable Assets.

In other exemplary embodiments the Redemption Ratio is reduced over time by decreasing Coefficient v or increasing Coefficient u to reflect the fees and expenses of the issuer.

In other exemplary embodiments the Redemption Ratio is increased over time by increasing Coefficient v or decreasing Coefficient u to reflect the income of the issuer.

In other exemplary embodiments the Redemption Ratio is defined as u/v.

In other exemplary embodiments, one or more classes of Compound Redeemable Instruments specify that they are or may become Compound Redeemable Instruments in their offering documents or other documents.

In other exemplary embodiments, one or more classes of Compound Redeemable Instruments do not specify that they are or may become Compound Redeemable Instruments in their offering documents or other documents.

In other exemplary embodiments, one or more classes of Compound Redeemable Instruments specify Exchangeable Assets in their documentation.

In other exemplary embodiments, one or more classes of Compound Redeemable Instruments do not specify Exchangeable Assets in their documentation.

In other exemplary embodiments, one or more Instrument Units comprise Compound Redeemable Instruments of the same classes in the same numbers as one or more other Instrument Units.

In other exemplary embodiments, one or more Instrument Units comprise one or more Compound Redeemable Instruments from each of two different classes of Compound Redeemable Instruments.

In other exemplary embodiments, one or more Instrument Units comprise one or more Compound Redeemable Instruments from each of more than two different classes of Compound Redeemable Instruments.

In other exemplary embodiments, one or more Instrument Units comprise Compound Redeemable Instruments of different classes than one or more other Instrument Units.

In other exemplary embodiments, one or more Instrument Units comprise Compound Redeemable Instruments of the same classes in different numbers as one or more other Instrument Units.

In other exemplary embodiments, all Instrument Units comprise the same number of Compound Redeemable Instruments from the same classes as each other Instrument Unit.

In other exemplary embodiments, not all Instrument Units comprise the same number of Compound Redeemable Instruments from the same classes as each other Instrument Unit.

In other exemplary embodiments, an Instrument Unit comprises Compound Redeemable Instruments of two or more classes in equal proportion to each other.

In other exemplary embodiments, an Instrument Unit comprises Compound Redeemable Instruments of two or more classes not in equal proportion to each other.

In other exemplary embodiments, all Instrument Units comprise Compound Redeemable Instruments of every class in the same proportion as the capital structure of the issuer.

In other exemplary embodiments, not all Instrument Units comprise Compound Redeemable Instruments of every class in the same proportion as the capital structure of the issuer.

In other exemplary embodiments, one or more Asset Units comprise Exchangeable Assets of the same classes in the same numbers as one or more other Asset Units.

In other exemplary embodiments, one or more Asset Units comprise Exchangeable Assets of one or more different classes than one or more other Asset Units.

In other exemplary embodiments, one or more Asset Units comprise Exchangeable Assets of the same classes in different numbers as one or more other Asset Units.

In other exemplary embodiments, one or more classes of Compound Redeemable Instruments comprise instruments that are securities, such as stock shares, units, bonds or options.

In other exemplary embodiments, one or more classes of Compound Redeemable Instruments comprise instruments that are not securities, such as swap agreements or other business agreements.

In other exemplary embodiments, Compound Redeemable Instruments comprising one Instrument Set redeem in exchange for Exchangeable Assets comprising one Asset Set.

In other exemplary embodiments, Compound Redeemable Instruments comprising a positive number of Instrument Sets redeems in exchange for Exchangeable Assets comprising a positive number of Asset Sets.

In other exemplary embodiments, all Compound Redeemable Instruments in an Instrument Set redeem simultaneously.

In other exemplary embodiments, not all Compound Redeemable Instruments in an Instrument Set redeem simultaneously.

In other exemplary embodiments, Compound Redeemable Instruments in an Instrument Set do not redeem simultaneously.

In other exemplary embodiments, a Redemption Instance may occur in stages over time where all or less than all of the Compound Redeemable Instruments comprising the Instrument Set redeem in exchange for all or less than all of the Exchangeable Assets comprising the Asset Set in stages of the Redemption Instance occurring at different times.

In other exemplary embodiments, the right or responsibility to complete one or more stages of a staged Redemption Instance may be contingent upon a reference underlying, outcome event or some other contingency.

In other exemplary embodiments, the right or responsibility to complete one or more stages of a staged Redemption Instance may not be contingent upon a reference underlying, outcome event or some other contingency.

In other exemplary embodiments, Compound Redeemable Instruments of one or more classes can be redeemed through conventional means as well as through Compound Redemption.

In other exemplary embodiments, the issuer owns Asset Sets corresponding to its outstanding Instrument Sets.

In other exemplary embodiments, the issuer does not own Asset Sets corresponding to its outstanding Instrument Sets.

In other exemplary embodiments, one or more Compound Redeemable Instruments specify that the issuer own Asset Sets, Exchangeable Assets or other collateral corresponding to a specified proportion of its Instrument Sets outstanding.

In other exemplary embodiments, one or more Compound Redeemable Instruments do not specify that the issuer own Asset Sets, Exchangeable Assets or other collateral corresponding to a specified proportion of its Instrument Sets outstanding.

In other exemplary embodiments, rights or other associated entitlements held by owners of Exchangeable Assets are transferred to holders of one or more classes of Compound Redeemable Instruments.

In other exemplary embodiments, rights or other associated entitlements held by owners of Exchangeable Assets are not transferred to holders of one or more classes of Compound Redeemable Instruments.

In other exemplary embodiments, rights or other associated entitlements held by owners of Exchangeable Assets are transferred to one or more entities other than holders of one or more classes of Compound Redeemable Instruments.

In other exemplary embodiments, rights or other associated entitlements held by owners of Exchangeable Assets are not transferred to other than holders of one or more classes of Compound Redeemable Instruments.

In other exemplary embodiments, Compound Redeemable Instruments are secured by Exchangeable Assets serving as collateral.

In other exemplary embodiments, Compound Redeemable Instruments are secured by other than Exchangeable Assets serving as collateral.

In other exemplary embodiments, Compound Redeemable Interests are not secured by collateral.

In other exemplary embodiments, Compound Redeemable Instruments are secured by collateral that is managed actively by the issuer or a third party.

In other exemplary embodiments, Compound Redeemable Instruments are secured by collateral that is managed passively by the issuer or a third party.

In other exemplary embodiments, Compound Redeemable Instruments are secured by collateral that is not managed by the issuer or a third party.

In other exemplary embodiments, Compound Redemption is secured by Exchangeable Assets serving as collateral.

In other exemplary embodiments, Compound Redemption is secured by other than Exchangeable Assets serving as collateral.

In other exemplary embodiments, Compound Redemption is not secured by collateral.

In other exemplary embodiments, Compound Redemption is secured by collateral that is managed actively by the issuer, the system proprietor or a third party.

In other exemplary embodiments, Compound Redemption is secured by collateral that is managed passively by the issuer or a third party.

In other exemplary embodiments, Compound Redemption is secured by collateral that is not managed by the issuer or a third party.

In other exemplary embodiments, Compound Redeemable Instruments issue in exchange for depositing Exchangeable Assets.

In other exemplary embodiments, Compound Redeemable Instruments do not issue in exchange for depositing Exchangeable Assets.

In other exemplary embodiments, Compound Redeemable Instruments issue in exchange for depositing other than Exchangeable Assets.

In other exemplary embodiments, Compound Redeemable Instruments do not issue in exchange for depositing other than Exchangeable Assets.

In other exemplary embodiments, all Compound Redeemable Instruments are issued initially as Compound Redeemable Instruments.

In other exemplary embodiments, not all Compound Redeemable Instruments are issued initially as Compound Redeemable Instruments.

In other exemplary embodiments, all Compound Redeemable Instruments are transformed instruments that were not initially Compound Redeemable Instruments.

In other exemplary embodiments, not all Compound Redeemable Instruments are transformed instruments that were not initially Compound Redeemable Instruments.

In other exemplary embodiments, one or more classes of Compound Redeemable Instruments are derivative instruments including terms selected from a broad universe of terms incorporating virtually any payoff formulation and reference underlying either singly or in combination that may or may not be possible to buy, hold, sell or otherwise invest in either directly or indirectly.

In other exemplary embodiments, one or more classes of Compound Redeemable Instruments are derivative instruments that reference Exchangeable Assets in their payout terms.

In other exemplary embodiments, one or more classes of Compound Redeemable Instruments are derivative instruments that do not reference Exchangeable Assets in their payout terms.

In other exemplary embodiments, one or more classes of Compound Redeemable Instruments are not derivative instruments.

In other exemplary embodiments, Compound Redeemable Instruments issue from a U.S. based issuer.

In other exemplary embodiments, Compound Redeemable Instruments issue from a non-U.S. based issuer.

In other exemplary embodiments, Compound Redeemable Instruments issue from a trust.

In other exemplary embodiments, Compound Redeemable Instruments issue from other than a trust.

In other exemplary embodiments, Compound Redeemable Instruments issue from a special purpose vehicle.

In other exemplary embodiments, Compound Redeemable Instruments issue from other than a special purpose vehicle.

In other exemplary embodiments, Compound Redeemable Instruments issue from a corporation.

In other exemplary embodiments, Compound Redeemable Instruments issue from other than a corporation.

In other exemplary embodiments, Compound Redeemable Instruments issue from a partnership.

In other exemplary embodiments, Compound Redeemable Instruments issue from other than a partnership.

In other exemplary embodiments, Compound Redeemable Instruments issue from a Real Estate Investment Trust.

In other exemplary embodiments, Compound Redeemable Instruments issue from other than a Real Estate Investment Trust.

In other exemplary embodiments, Compound Redeemable Instruments issue from a Master Limited Partnership.

In other exemplary embodiments, Compound Redeemable Instruments issue from other than a Master Limited Partnership Trust.

In other exemplary embodiments, Compound Redeemable Instruments issue from a Grantor Trust.

In other exemplary embodiments, Compound Redeemable Instruments issue from other than a Grantor Trust.

In other exemplary embodiments, Compound Redeemable Instruments issue from a Regulated Investment Company.

In other exemplary embodiments, Compound Redeemable Instruments issue from other than a Regulated Investment Company.

In other exemplary embodiments, Compound Redeemable Instruments issue from a pass-through entity for Federal tax purposes.

In other exemplary embodiments, Compound Redeemable Instruments issue from other than a pass-through entity for Federal tax purposes.

In other exemplary embodiments, Compound Redeemable Instruments issue from a Registered Investment Company.

In other exemplary embodiments, Compound Redeemable Instruments issue from other than a Registered Investment Company.

In other exemplary embodiments, Compound Redeemable Instruments issue from a federal or state sanctioned exchange.

In other exemplary embodiments, Compound Redeemable Instruments issue from other than a federal or state sanctioned exchange.

In other exemplary embodiments, Compound Redeemable Instruments are not issued from a federal or state sanctioned exchange.

In other exemplary embodiments, Compound Redeemable Instruments are not issued from other than a federal or state sanctioned exchange.

In other exemplary embodiments, Compound Redeemable Instruments are transferable.

In other exemplary embodiments, Compound Redeemable Instruments are privately placed.

In other exemplary embodiments, Compound Redeemable Instruments are not privately placed.

In other exemplary embodiments, Compound Redeemable Instruments are listed on a public exchange.

In other exemplary embodiments, Compound Redeemable Instruments are not listed on a public exchange.

In other exemplary embodiments, Compound Redeemable Instruments are listed on other than a public exchange.

In other exemplary embodiments, Compound Redeemable Instruments are not listed on other than a public exchange.

In other exemplary embodiments, Compound Redeemable Instruments are transferred informally.

In other exemplary embodiments, Compound Redeemable Instruments are transferred other than informally.

In other exemplary embodiments, Compound Redeemable Instruments are traded on a public exchange.

In other exemplary embodiments, Compound Redeemable Instruments are not traded on a public exchange.

In other exemplary embodiments, Compound Redeemable Instruments are traded on other than a public exchange.

In other exemplary embodiments, Compound Redeemable Instruments are not traded on other than a public exchange.

In other exemplary embodiments, Compound Redeemable Instruments are traded or not according to user instructions.

In other exemplary embodiments, Compound Redeemable Instruments are traded among qualified investors in the 144A marketplace through a facility such as the NASDAQ PORTAL Alliance System.

In other exemplary embodiments, Compound Redeemable Instruments are not traded among qualified investors in the 144A marketplace through a facility such as the NASDAQ PORTAL Alliance System.

In other exemplary embodiments, Compound Redeemable Instruments are traded other than among qualified investors in the 144A marketplace through a facility such as the NASDAQ PORTAL Alliance System.

In other exemplary embodiments, Compound Redeemable Instruments are not traded other than among qualified investors in the 144A marketplace through a facility such as the NASDAQ Portal facility.

In other exemplary embodiments, a Compound Redeemable Instrument includes a first Financial Instrument being exchanged as a redemption fee for a second Financial Instrument.

Conclusion

The present invention, as described above and as further defined by the claims below, provides apparatus and methods of implementing a system of issuing and redeeming Compound Redeemable Instruments for Exchangeable Assets.

What is claimed is:

1. A computerized apparatus for processing trades of compound redeemable instruments, the computerized apparatus comprising:
    a network access device in logical communication with a communications network, said network access device comprising a processor and a storage; and
    executable software stored on the network access device and executable on demand, the software operative with the processor to cause the network access device to:
    receive data descriptive of an instrument set comprising compound redeemable instruments, said compound redeemable instruments including a first issuer financial instrument of a first instrument class and a second issuer financial instrument of a second instrument class;
    receive data descriptive of an offer for compound redemption, wherein the compound redemption includes an exchange of the instrument set for an asset set comprising one or more predefined exchangeable assets;
    receive data descriptive of the asset set comprising an absolute number of exchangeable assets exchangeable in an instance of compound redemption for the instrument set; and
    transmit a digital instruction to execute a trade consummating the compound redemption of the instrument set in exchange for the asset set.

2. The apparatus of claim 1 wherein the digital instruction to execute a compound redemption comprises redemption of compound redeemable instruments and acquisition or disposal of assets.

3. The apparatus of claim 1 wherein:
    the instrument set comprises at least one derivative instrument and at least one equity instrument of a special purpose vehicle, wherein the at least one derivative instrument and at least one equity instrument are jointly redeemable for a predetermined quantity of one or more specified financial instruments or commodities comprising the predefined exchangeable assets.

4. The apparatus of claim 3 wherein the at least one derivative instrument comprises a payout linked to one or more financial instruments, assets or observations.

5. The apparatus of claim 1, wherein the first instrument comprises a first exchange traded note and the second instrument comprises a second exchange traded note and the asset set comprises assets, including pecuniary amounts, based upon one or more indices, commodities, financial instruments, assets or observations individually or in combination.

6. The apparatus of claim 1, wherein the asset set exchangeable in an instance of compound redemption for the issuer financial instruments comprises a pecuniary amount based upon a schedule.

7. The apparatus of claim 1, wherein the asset set exchangeable in an instance of compound redemption for the issuer financial instruments comprises financial instruments of the issuer.

8. The apparatus of claim 1, wherein the instrument set comprises financial instruments of a plurality of disparate issuers and the financial instruments are jointly redeemable in exchange for predefined exchangeable assets, the disparate issuers are determinative of disparate classes.

9. The apparatus of claim 1 wherein the executable software is additionally operative to cause the network access device to transmit an instruction via digital data to purchase, one or more of the compound redeemable instrument sets in place of the step of transmitting a digital instruction to execute a compound redemption on behalf of a holder for the instrument set in exchange for the asset set.

10. The apparatus of claim 1 wherein the executable software is additionally operative to cause the network access device to transmit one or more trade instructions related to fulfillment of the transmitted digital instruction to execute a compound redemption.

11. The apparatus of claim 10 wherein the executable software is additionally operative to cause the network access device to transit an instruction to transfer the asset set or remove the asset set to an account associated with the holder.

12. The apparatus of claim 11 wherein the executable software is additionally operative to cause the network access device to additionally receive digital data comprising an enumeration of a number of compound redeemable instrument sets owned by a holder and a description of assets for which the compound redeemable instrument sets may be redeemed.

13. The apparatus of claim 11 wherein the executable software is additionally operative to cause the network access device to receive digital data comprising an enumeration of executed transactions associated with the holder.

14. The apparatus of claim 12 wherein the additionally received digital data additionally comprises an amount of currency for which the compound redeemable instrument sets may be redeemed.

15. The apparatus of claim 1 wherein the instrument set comprises one or more derivative instruments and one or more equity instruments of a special purpose vehicle.

16. The apparatus of claim 15 wherein the exchangeable assets, for which the at least one or more derivative instruments and one or more equity instruments are jointly redeemable and comprise one or more of: specified financial instruments, commodities and cash amounts.

17. The apparatus of claim 1 wherein the instrument set comprises equity shares and bonds which are jointly redeemable in exchange for an asset set comprising finished goods inventory, thereby enabling a marketplace to value the equity shares and bonds on the basis of the issuer's products.

18. The apparatus of claim 1 wherein the instrument set comprises at least one equity share and one bond which correlate with an asset set comprising one or more of: specified financial instruments, commodities and cash amounts.

19. The apparatus of claim 1 wherein the instrument set comprises at least one equity unit and one contract which correlate with an asset set comprising one or more of: specified financial instruments, commodities and cash amounts.

20. The apparatus of claim 1 wherein the instrument set comprises at least one equity unit and one contract which correlate with an asset set comprising a predetermined quantity of equity shares in a first corporation and a predetermined quantity of equity shares in a second corporation.

* * * * *